(12) United States Patent
Jung et al.

(10) Patent No.: US 10,812,637 B2
(45) Date of Patent: Oct. 20, 2020

(54) ELECTRONIC DEVICE FOR PERFORMING OPERATION BASED ON STATUS INFORMATION THEREOF AND OPERATING METHOD THEREOF

(71) Applicant: Samsung Electronics Co., Ltd., Gyeonggi-do (KR)

(72) Inventors: Jongwoo Jung, Gyeonggi-do (KR); Jiin Baek, Gyeonggi-do (KR); Hyunjin Han, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/580,093

(22) Filed: Sep. 24, 2019

(65) Prior Publication Data
US 2020/0177714 A1    Jun. 4, 2020

(30) Foreign Application Priority Data
Dec. 4, 2018  (KR) .................. 10-2018-0154567

(51) Int. Cl.
*H04M 1/02* (2006.01)
*H04M 1/725* (2006.01)

(52) U.S. Cl.
CPC ....... *H04M 1/0243* (2013.01); *H04M 1/0268* (2013.01); *H04M 1/72533* (2013.01);
(Continued)

(58) Field of Classification Search
CPC ............. H04M 1/0243; H04M 1/0268; H04M 1/72533; H04M 1/72572; H04M 1/0216; H04M 2250/12; H04M 2250/52
(Continued)

(56) References Cited

U.S. PATENT DOCUMENTS

2009/0197615 A1*  8/2009  Kim .................. H04M 1/605
                                                                    455/456.1
2011/0239142 A1*  9/2011  Steeves ............. H04M 1/72522
                                                                    715/764
(Continued)

FOREIGN PATENT DOCUMENTS

KR    10-2013-0113895 A    10/2013
KR    10-2015-0066727 A     6/2015
KR    10-2017-0086470 A     7/2017

OTHER PUBLICATIONS

International Search Report dated Jan. 6, 2020.

*Primary Examiner* — Mong-Thuy T Tran
(74) *Attorney, Agent, or Firm* — Cha & Reiter, LLC.

(57) ABSTRACT

According to one or more embodiments, an electronic device may include a foldable housing including a first housing structure and a second housing structure foldably connected to the first housing structure, a flexible display disposed in the foldable housing, a display disposed on a first surface of the first housing structure or the second housing structure, the first surface being opposite to a second surface of the foldable housing on which the flexible display structure is disposed, and a processor. The processor may be configured to detect a folding of the foldable housing caused by a user gesture, identify status information of the electronic device in response to detecting the folding of the foldable housing, determine a user's intention for the user gesture, based on both the user gesture and the status information, and perform a particular operation corresponding to the user's intention. Other embodiments are also disclosed.

16 Claims, 23 Drawing Sheets

(52) U.S. Cl.
CPC ...... *H04M 1/72572* (2013.01); *H04M 1/0216* (2013.01); *H04M 2250/12* (2013.01); *H04M 2250/52* (2013.01)

(58) Field of Classification Search
USPC .......................................... 455/575.3, 575.1
See application file for complete search history.

(56) References Cited

U.S. PATENT DOCUMENTS

| | | | | |
|---|---|---|---|---|
| 2013/0076658 A1* | 3/2013 | Cassar | ................. | G06F 3/0485 345/173 |
| 2013/0210488 A1* | 8/2013 | Lee | ................. | H04N 21/42224 455/557 |
| 2013/0265221 A1 | 10/2013 | Lee et al. | | |
| 2013/0328878 A1* | 12/2013 | Stahl | ........................ | G06T 3/40 345/428 |
| 2014/0055375 A1 | 2/2014 | Kim et al. | | |
| 2014/0132543 A1* | 5/2014 | Kim | ...................... | G06F 1/1626 345/173 |
| 2014/0198070 A1* | 7/2014 | Won | ...................... | G06F 3/0412 345/173 |
| 2014/0359493 A1* | 12/2014 | Hong | ................... | G06F 3/1454 715/761 |
| 2014/0378183 A1* | 12/2014 | Xiong | ............... | H04M 1/72522 455/556.1 |
| 2015/0061968 A1* | 3/2015 | Park | ...................... | G06F 3/1423 345/2.1 |
| 2015/0082184 A1* | 3/2015 | Kim | ........................ | H04W 4/80 715/740 |
| 2015/0160840 A1 | 6/2015 | Cho et al. | | |
| 2015/0160913 A1* | 6/2015 | Lee | ....................... | G06F 3/1454 345/2.2 |
| 2015/0199125 A1* | 7/2015 | Tsukamoto | ......... | G06F 3/04817 715/765 |
| 2015/0325216 A1* | 11/2015 | Park | ....................... | G06F 3/147 345/634 |
| 2015/0338888 A1 | 11/2015 | Kim et al. | | |
| 2017/0255442 A1 | 9/2017 | Kim et al. | | |
| 2017/0322597 A1 | 11/2017 | Lee et al. | | |
| 2020/0059543 A1* | 2/2020 | Chen | ...................... | G06F 1/1694 |

\* cited by examiner

ELECTRONIC DEVICE FOR PERFORMING OPERATION BASED ON STATUS INFORMATION THEREOF AND OPERATING METHOD THEREOF

CROSS-REFERENCE TO RELATED APPLICATION(S)

This application is based on and claims priority under 35 U.S.C. § 119 to Korean Patent Application No. 10-2018-0154567, filed on Dec. 4, 2018, in the Korean Intellectual Property Office, the disclosures of which are herein incorporated by reference in their entireties.

BACKGROUND

1. Technical Field

The instant disclosure generally relates to an electronic device for performing an operation based on status information thereof and to an operating method of the electronic device.

2. Description of Related Art

With the advent of mobile technologies, a great variety of electronic devices such as smart phones, tablet personal computers (PC), portable multimedia players (PMP), personal digital assistants (PDA), laptop PCs, and wearable devices are increasingly used. Furthermore, in recent years, an electronic device such as a foldable device including a flexible display and a foldable housing has been developed.

Using this foldable device, a user can perform various tasks in states where the foldable device is folded or unfolded, depending on the types of tasks.

Meanwhile, recent technologies allow electronic devices to output certain content (e.g., content requiring a large screen) through external electronic devices (e.g. large displays) connected to the electronic devices.

When the user of a foldable device folds the device while the device is unfolded, such folding may indicate a certain user intention.

For example, when the foldable device is in the unfolded state and is outputting a video, the user may perform an input for folding the foldable device with the intention to output the video through the connected external electronic device. Also, in the same situation, the user may perform the input for folding the foldable device with the intention to terminate the video output.

As such, though the user may perform the same user input with different intentions, the electronic device may fail to exactly understand the user's intention. As a result, the electronic device may often perform the wrong operation that is not intended by the user. This may cause inconvenience to the user when using the foldable device.

SUMMARY

Additional aspects will be set forth in part in the description which follows and, in part, will be apparent from the description, or may be learned by practice of the presented embodiments.

According to an embodiment of the disclosure, an electronic device may include a foldable housing including a first housing structure and a second housing structure foldably connected to the first housing structure; a flexible display disposed in the foldable housing; a display disposed on a first surface of the first housing structure or the second housing structure, the first surface being opposite to a second surface of the foldable housing on which the flexible display is disposed; and a processor. The processor may be configured to detect a folding of the foldable housing caused by a user gesture, to identify status information of the electronic device in response to detecting the folding of the foldable housing, to determine a user's intention for the user gesture, based on both the user gesture and the status information of the electronic device, and to perform a particular operation corresponding to the user's intention.

According to an embodiment of the disclosure, an electronic device may include a foldable housing; a communication module; a flexible display disposed in the foldable housing; a display disposed on a first surface of the foldable housing opposite to a second surface of the foldable housing on which the flexible display is disposed; and a processor. The foldable housing may include a first housing structure; and a second housing structure foldably connected to the first housing structure. The first housing structure and the second housing structure may be foldable about an axis so that the second housing structure may face the first housing structure in a folded state. The first and second housing structures may form a planar structure in an unfolded state. The processor may be configured to detect a folding of the foldable housing caused by a user gesture, to identify status information of the electronic device in response to detecting the folding of the foldable housing, to determine a user's intention for the user gesture, based on both the user gesture and the status information of the electronic device, to select an external electronic device to be connected to the electronic device, based on the user's intention, to control the communication module to be connected to the selected external electronic device, and to control the display to display a screen associated with control of the external electronic device.

According to an embodiment of the disclosure, an operating method of an electronic device may include detecting a folding of a foldable housing caused by a user gesture, the foldable housing including a first housing structure and a second housing structure foldably connected to the first housing structure; identifying status information of the electronic device in response to detecting the folding of the foldable housing; determining a user's intention for the user gesture, based on both the user gesture and the status information of the electronic device; and performing a particular operation corresponding to the user's intention [JL1].

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, embodiments of the disclosure will be described in detail with reference to accompanying drawings.

According to certain embodiments of the disclosure, when a user input of folding an electronic device is received, the electronic device and the operating method thereof may identify status information of the electronic device, determine the user's intention based on the status information, and perform a particular operation corresponding to the user's intention. This facilitates the performing of a desired operation without requiring any additional action of the user.

According to certain embodiments of the disclosure, when a user input of folding an electronic device is received, the electronic device and the operating method thereof may connect with a selected external electronic device for outputting content, based on status information of the electronic device, and control the external electronic device to output the content. This enables the electronic device to be simply connected to the external electronic device without requiring any additional action of the user.

According to certain embodiments of the disclosure, when a user input of folding an electronic device is received, the electronic device and the operating method thereof may execute an application and display a related screen, based on location information included in status information of the electronic device. This also improves the convenience of the user.

Figure 1:
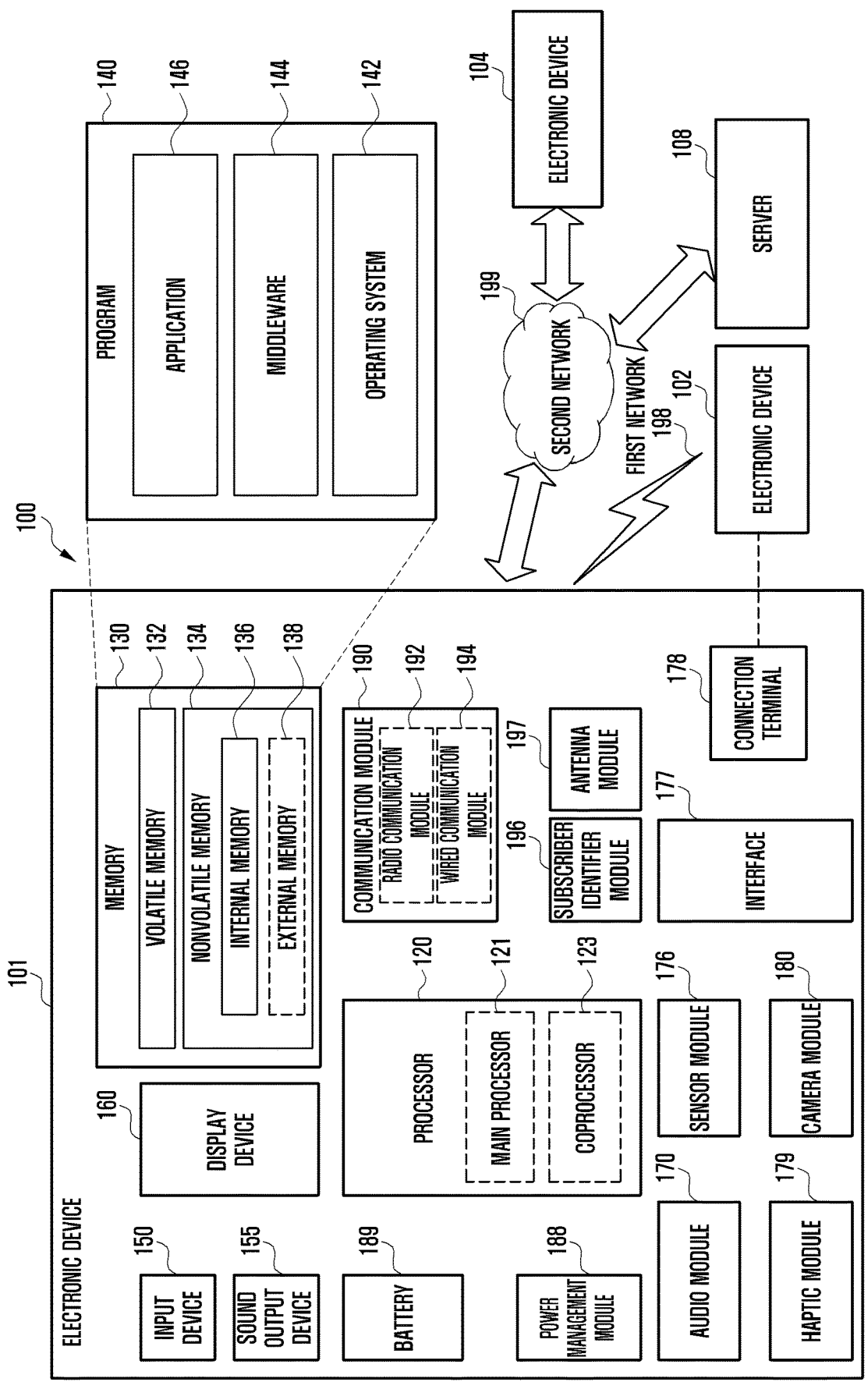
FIG. 1 is a block diagram illustrating an electronic device in a network environment according to an embodiment of the disclosure.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
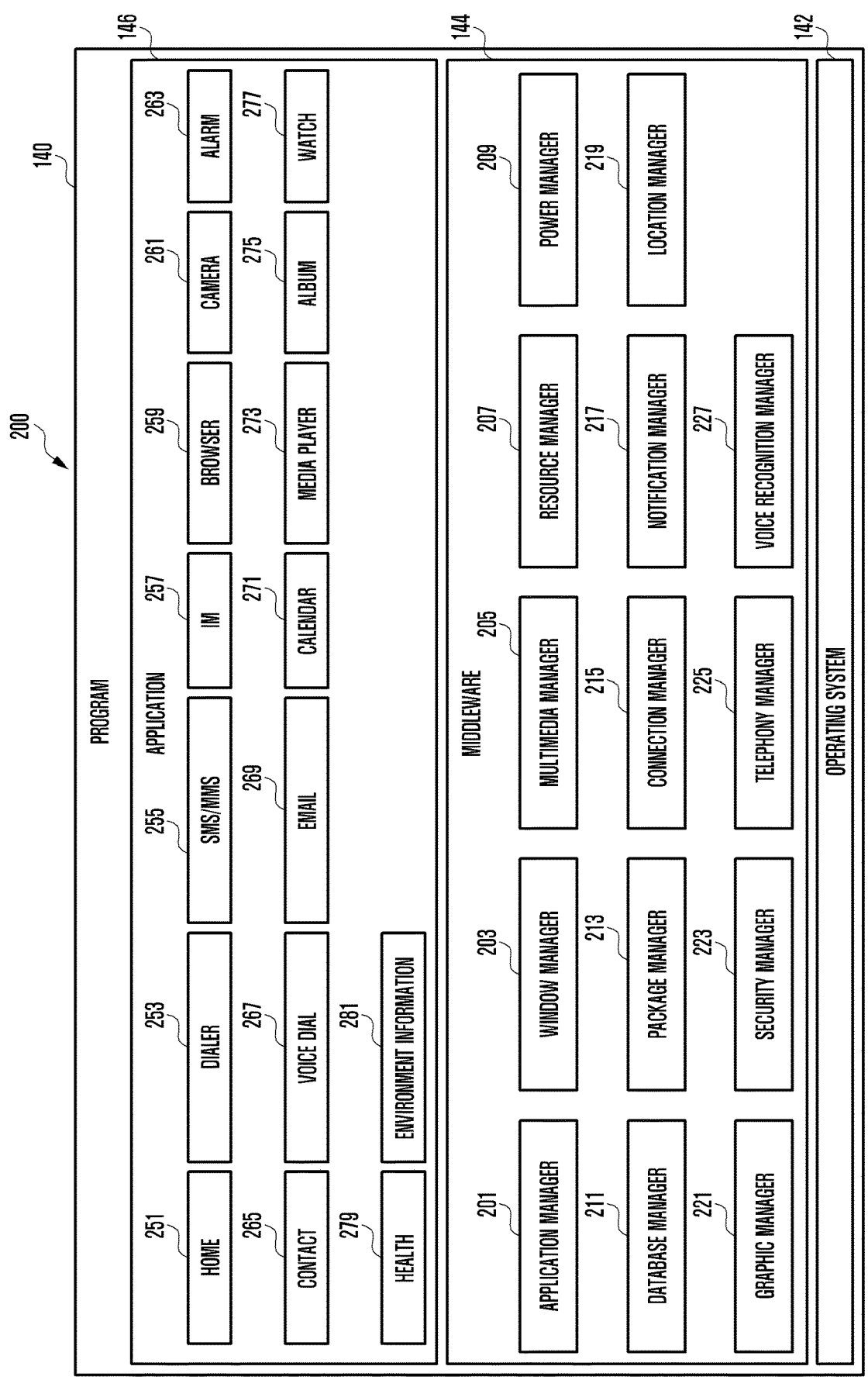
FIG. 2 is a block diagram illustrating a program according to an embodiment of the disclosure.

FIG. 2 is a block diagram 200 illustrating the program 140 according to an embodiment. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

FIGS. 3A to 3D are perspective views showing an electronic device according to an embodiment of the disclosure.

Referring to FIGS. 3A to 3D, the electronic device 300 (e.g., the electronic device 101 in FIG. 1) according to an embodiment may include a foldable housing 315, a first display 330, and a second display 350.

According to an embodiment, the electronic device 300 may include the foldable housing 315. The foldable housing 315 may include a first housing 310 and a second housing 320 which are connected to each other by at least one connecting member. The connecting member may be formed so that the angle between the first housing 310 and the second housing 320 may be changed. For example, the connecting member may be implemented as a hinge or a flexible material (e.g., a flexible printed circuit board). When the flexible printed circuit board is used, wiring may be disposed in the connecting member to electrically connect various components of the electronic device 300.

According to an embodiment, the second housing 320 may be connected to the first housing 310 and may be folded with respect to the first housing 310. The first housing 310 and the second housing 320 may be foldable to each other about a first axis 345 (i.e., a virtual line) extending in a first direction. In the folded state, the first housing 310 and the second housing 320 may be disposed to face each other.

Figure 3A:
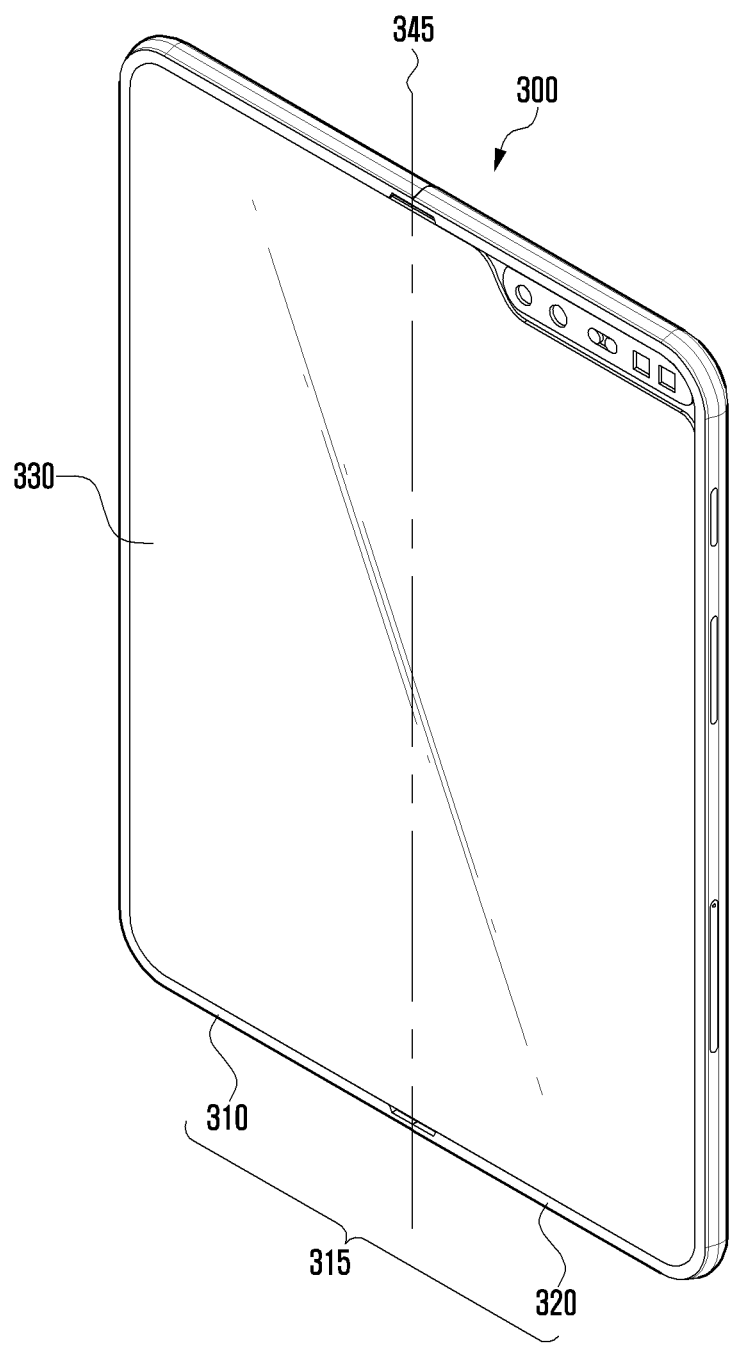
FIG. 3A, FIG. 3B, FIG. 3C, and FIG. 3D are perspective views showing an electronic device according to an embodiment of the disclosure.

Referring to FIG. 3A, when unfolded, the angle between the first housing 310 and the second housing 320 may be 180 degrees. When the angle between the first housing 310 and the second housing 320 is equal to or greater than a predetermined angle, it may be defined that the electronic device 300 is in an unfolded state. The predetermined angle may be 180 degrees, and it may be changed depending on the design of the device. When the electronic device 300 is in the unfolded state, the first housing 310 and the second housing 320 may form be substantially planar.

According to an embodiment, the first display 330 is implemented as a flexible display and can be folded or unfolded at various angles. The first display 330 may be folded about the virtual line 345 shown in FIG. 3A.

According to an embodiment, the first display 330 may be enclosed by both the first housing 310 and the second housing 320. The first housing 310 may enclose at least a portion of the first display 330, and the second housing 320 may enclose the other portion of the first display 330.

According to an embodiment, the first housing 310 and the second housing 320 may constitute the foldable housing 315. As such, the foldable housing 315 may be flexible and thus may be folded about the virtual line 345.

Figure 3B:
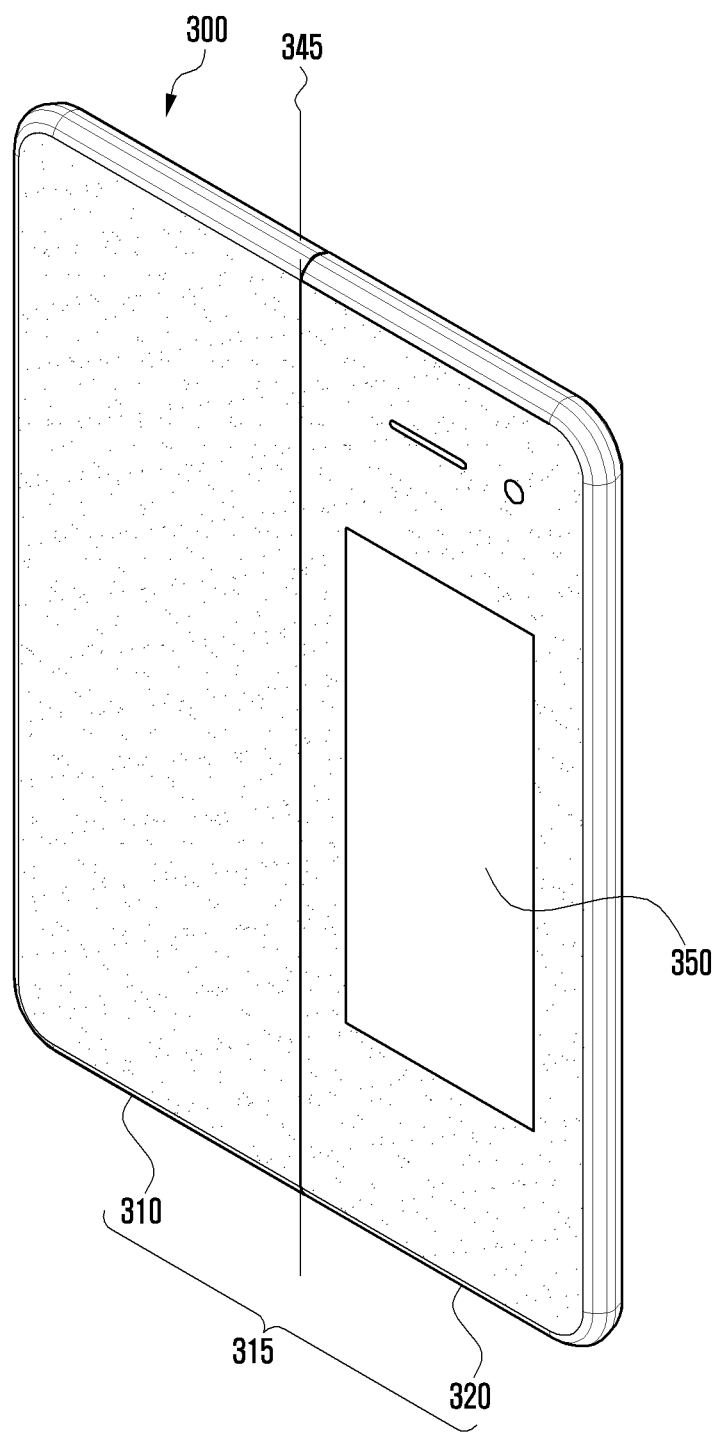

Referring to FIG. 3B, the electronic device 300 according to an embodiment may further include the second display 350.

According to an embodiment, the second display 350 may be disposed in the second housing 320 and disposed on a surface opposite to the surface on which the first display 330 is disposed. Although the second display 350 is illustrated as being disposed in the second housing 320, the second display 350 may be alternatively disposed in the first housing 310. Aside from not overlapping the first display 330, there is no limitation on the position and size of the second display 350.

Figure 3C:
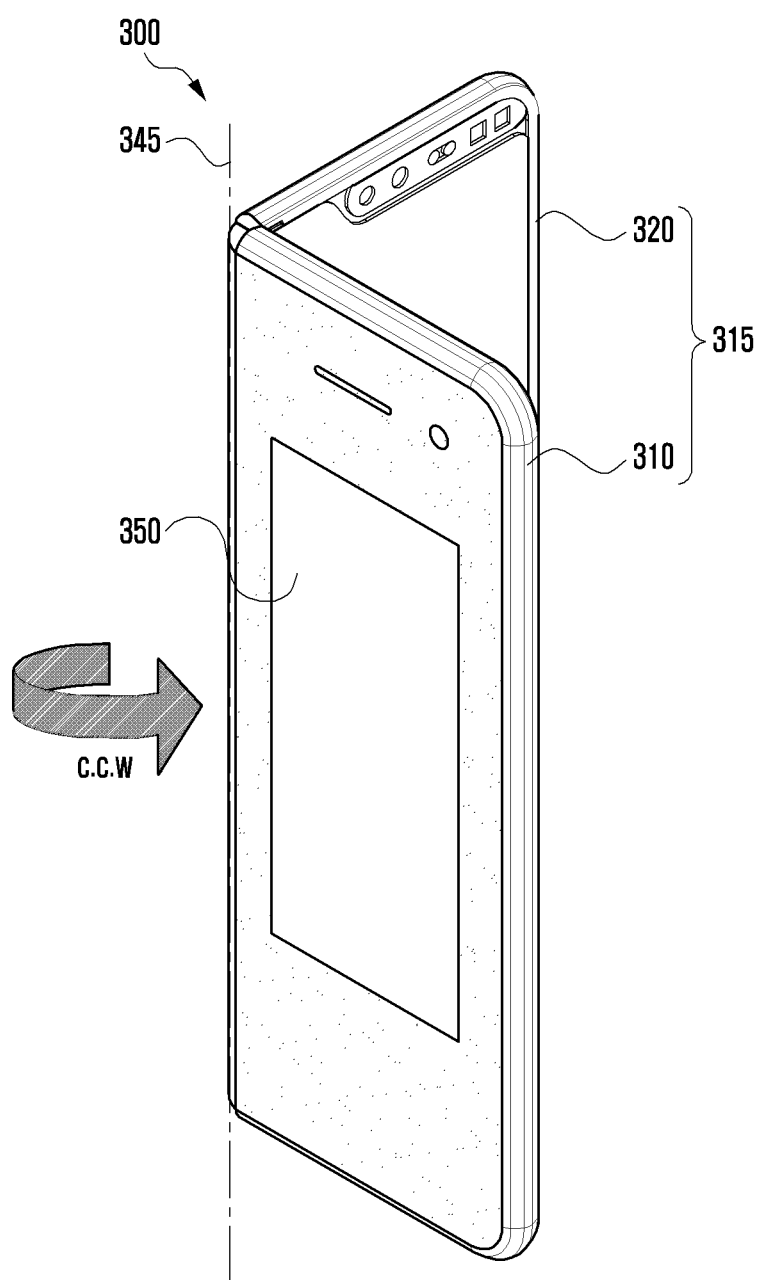
Figure 3D:
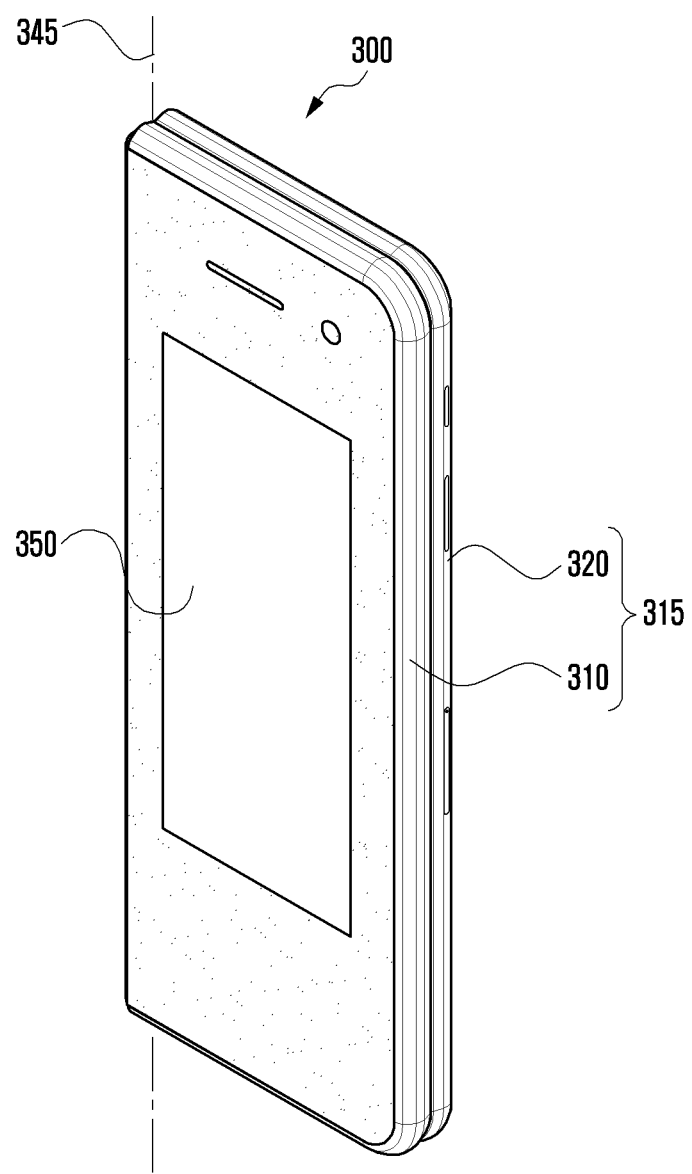

FIG. 3C is a perspective view showing a state where the electronic device 300 according to an embodiment is folded in part counterclockwise (CCW) about the virtual line 345, and FIG. 3D is a perspective view showing a state where the electronic device 300 according to an embodiment is folded to the maximum about the virtual line 345.

Referring to FIGS. 3C and 3D, the electronic device 300 is folded about the virtual line 345. Alternatively or additionally, the electronic device 300 may be folded in various forms around a certain line other than the virtual line 345. For example, the electronic device 300 may be folded about a certain line perpendicular to the virtual line 345.

The electronic device 300 according to an embodiment may operate in the unfolded state as shown in FIG. 3A or in the folded state as shown in FIG. 3D, depending on a user's intention. For example, in the unfolded state as shown in FIG. 3A, the electronic device 300 may output screens of various applications, such as word processors, media players, or the like on the first display 330. Also, in the folded state as shown in FIG. 3B, the electronic device 300 may output simpler information, such as notifications, on the second display 350.

Figure 4:
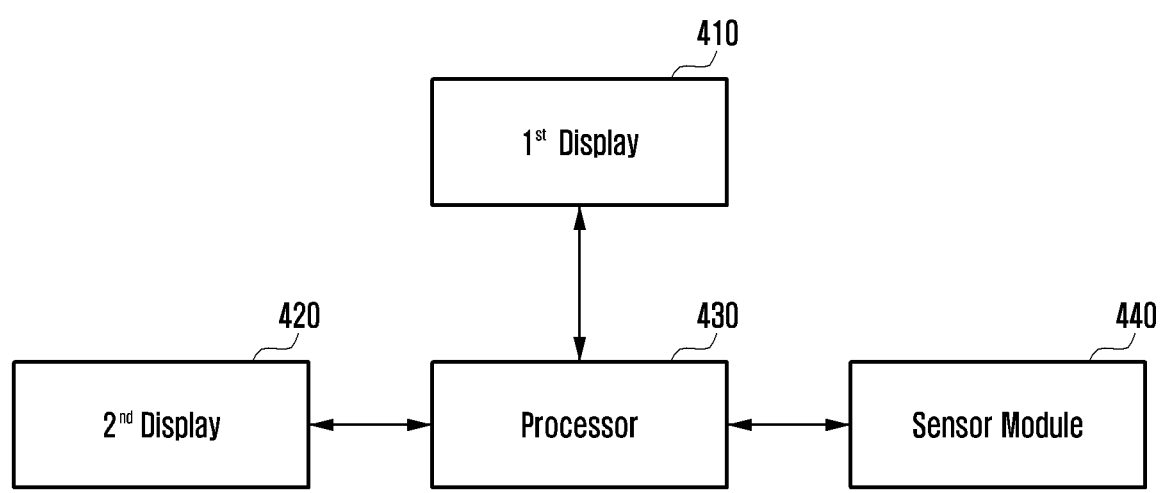
FIG. 4 is a block diagram illustrating an electronic device according to an embodiment of the disclosure.

FIG. 4 is a block diagram illustrating an electronic device according to an embodiment of the disclosure.

Referring to FIG. 4, the electronic device (e.g., the electronic device 300 in FIGS. 3A to 3D) according to an embodiment may include a first display 410 (e.g., the first display 330 in FIG. 3A), a second display 420 (e.g., the second display 350 in FIG. 3B), a processor 430 (e.g., the processor 120 in FIG. 1), and a sensor module 440 (e.g., the sensor module 176 in FIG. 1). The processor 430 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the first display 410 may display various screens under the control of the processor 430. As described above, the first display 410 may be a flexible display made from a flexible material. When the electronic device 300 is folded about a virtual line (e.g., the virtual line 345 in FIG. 3A), the first display 410 may terminate operation. In contrast, when the electronic device 300 is unfolded about the virtual line 345, the first display 410 may be operated.

According to an embodiment, the second display 420 may display various screens under the control of the processor 430. The second display 420 may be operated when the electronic device 300 is folded about the virtual line 345. In contrast, the second display 420 may terminate operation when the electronic device 300 is unfolded about the virtual line 345.

According to an embodiment, the sensor module 440 may detect various operating statuses of the electronic device 300 (e.g., battery power remaining) and/or external environmental statuses (e.g., the location of the electronic device 300, a status of the user of the electronic device 300), and then generate data corresponding to the detected status. According to embodiments, the sensor module 176 may include at least one of a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to an embodiment, the processor 430 may receive a user gesture that folds a foldable housing (e.g., the foldable housing 315 in FIG. 3A). This user gesture of folding the foldable housing 315 may be a user's action that reduces the angle between the first housing 310 and the second housing 320 to less than a predetermined angle. In contrast, a user's action that increases the angle between the first housing 310 and the second housings 320 to more than a predetermined angle may be a user gesture for unfolding the foldable housing 315.

According to an embodiment, the angle between the first housing 310 and the second housing 320 may be measured by the sensor module 340 through various methods. For example, when one of the first housing 310 and the second housing 320 has a magnet, and when the other has a hall sensor capable of sensing the magnet, the angle between the first housing 310 and the second housing 320 may be measured by the hall sensor.

According to an embodiment, the processor 430 may identify status information of the electronic device 300 in response to receiving a user gesture. Then, based on the status information of the electronic device 300, the processor 430 may determine the user's intention for the user gesture and perform a particular operation corresponding to the user's intention.

According to an embodiment, depending on different status information of the electronic device 300, the processor 430 may determine different user's intentions. Therefore, even when receiving the same user gesture, the processor 430 may recognize different user's intentions based on the status information of the electronic device 300 and then perform different operations corresponding to the different intentions [JL2].

According to an embodiment, the status information of the electronic device 300 may include information regarding an application being executed when the user gesture of folding the foldable housing 315 is received.

According to an embodiment, the information regarding an executed application may include information about the type of application (e.g., a video playback application, a music player application, a document editor application, a document viewer application, or the like).

According to an embodiment, in response to receiving a user gesture of folding the foldable housing 315 while executing a content playback application, the processor 430 may determine that the user's intention is for content playback in an external electronic device. Then, the processor 430 may select a particular external electronic device for performing the content playback from among one or more external electronic devices connected to the electronic device 300. The processor 430 may control the selected external electronic device to perform the content playback. Then, the processor 430 may transmit the content to the selected external electronic device for playback, or control the selected external electronic device to access an external server that provides the content for playback. The content may be in various formats such as sound, still image, or video.

According to an embodiment, when there are a plurality of external electronic devices connected to the electronic device 300, the processor 430 may select, using various methods and/or criteria, one external electronic device that will perform a content playback.

According to an embodiment, the processor 430 may select one external electronic device based on the characteristics of content being played back and the characteristics of external electronic devices connected to the electronic device 300. The characteristics of content being played back may include the type of content (e.g., sound, still image, video, document, etc.), the quality of content (e.g., image quality such as ultra-high definition (UHD), full high definition (FHD), or high definition (HD) when the content is video, sound quality such as 192 kbps or 320 kbps when the content is sound, etc.), and the like. For example, when the content being played back contains sound, the processor 430 may select an external electronic device capable of outputting sound as the external electronic device for outputting the content. In another example, when the content being played back is video, the processor 430 may select an external electronic device (e.g., a television or a monitor) capable of outputting the video as the external electronic device for outputting the content.

According to an embodiment, the processor 430 may check a connection history of external electronic devices and then select the most frequently used external electronic device as the external electronic device for playing back the content. In addition, based on the priority of each external electronic device, the processor 430 may select an external electronic device having the highest priority as the external electronic device for playing back the content. The priorities of the external electronic devices may be determined by user's setting. Alternatively, such priorities may be set by the processor 430 based on the connection history including the number of times of each external electronic device is connected to the electronic device 300 and further based on the location of the electronic device 300 when each external electronic device is connected.

According to an embodiment, the processor 430 may check a screen aspect ratio when the electronic device 300 is folded, and then select a particular external electronic device having a screen aspect ratio similar to the folded screen ratio from among external electronic devices connected to the electronic device 300. This embodiment will be described later with reference to FIGS. 6A to 6C.

According to another embodiment, when there are a plurality of external electronic devices connected to the electronic device 300, the processor 430 may select two or more external electronic devices from among the connected external electronic devices using various methods. For example, when the electronic device 300 is outputting content through a content output application, the processor 430 may select one external electronic device for displaying the video of the content and also select another external electronic device for outputting the sound of the content.

According to an embodiment, when there are a plurality of external electronic devices connected to the electronic device 300, the processor 430 may receive a user input that selects an external electronic device for outputting content from among the plurality of external electronic devices. In addition, the processor 430 may control the second display 420 to display a list of the plurality of external electronic devices thereon. The list of the plurality of external electronic devices may be displayed in various ways and will be described later in FIGS. 5A to 5F.

According to an embodiment, the processor 430 may display, on the second display 420, various objects (e.g. user interface objects) for controlling an external electronic device. The processor 430 may control the external electronic device based on a user input to such objects displayed on the second display 420.

According to an embodiment, the processor 430 may select an external electronic device for outputting content from among external electronic devices connected to the electronic device 300. Alternatively, the processor 430 may select an external electronic device for outputting content from among external electronic devices having a history of being connected to the electronic device 300, and then control a communication module (e.g., the communication module 190 in FIG. 1) to connect the electronic device 300 and the selected external electronic device and transmit/receive data.

According to an embodiment, if, to output content, the electronic device 300 must download the content from an external server in real time, the processor 430 may control the second display 420 to output a message for the user to confirm whether to download the content.

According to an embodiment, the status information of the electronic device 300 may include location information of the electronic device 300. The location information of the electronic device 300 may be identified by a GPS module or a GNSS module included in the electronic device 300. According to another embodiment, the location information of the electronic device 300 may be identified based on information of a network to which the electronic device 300 is connected. Using location-related data temporarily or persistently stored in the memory (e.g., the memory 130 in FIG. 1) of the electronic device 300, the processor 430 may determine the type of the place where the electronic device 300 is located. For example, such place types may be classified into shopping mall, department store, café, restaurant, and the like.

According to an embodiment, based on the location information of the electronic device 300 included in the status information of the electronic device 300, the processor 430 may determine the user's intention when folding the foldable housing 315 and perform a particular operation corresponding to the user's intention.

According to an embodiment, based on the location information of the electronic device 300, the processor 430 may execute an application associated with the place where the electronic device 300 is located. Also, the processor 430 may control the second display 420 to display a screen associated with the executed application thereon.

For example, when the electronic device 300 is located in a café, the processor 430 may execute an application for ordering a food or drink in the café, and display an associated screen on the second display 420.

As another example, in response to identifying that the electronic device 300 is located in an airport, the processor 430 may execute an application for issuing an airline ticket, and display the airline ticket on the second display 350. A detailed embodiment for determining the user's intention based on the location information of the electronic device 300 will be described later with reference to FIGS. 8A and 8B.

According to an embodiment, the status information of the electronic device 300 may include battery information of the electronic device 300. The processor 430 may check the battery information of the electronic device 300 and identify whether the battery power remaining is less than a predetermined value.

According to an embodiment, when receiving the user gesture of folding the foldable housing 315, and in response to identifying that the battery power remaining is less than the predetermined value, the processor 430 may determine that the user's intention is to execute the application, being currently executed in the electronic device, in an external electronic device. For example, when the currently executed application is a content playback application, the processor 430 may determine that the user's intention is to output the content in the external electronic device. Then, the processor 430 may control the external electronic device to output the content.

According to an embodiment, the status information of the electronic device 300 may include information about a network to which the electronic device 300 is currently connected or to which the electronic device 300 can connect to.

According to an embodiment, the processor 430 may determine the user's intention, based on information collected from the various sensors included in the electronic device 300. For example, the processor 430 may determine the user's intention by using at least one sensor including a camera capable of photographing the user's face, a microphone capable of receiving the user's voice, or a gyro sensor capable of detecting the movement of the electronic device 300. A detailed embodiment for determining the user's intention based on information collected from various sensors will be described later with reference to FIGS. 7A and 7B.

According to an embodiment, the processor 430 may determine the user's intention, based on information related to the angle between the first housing 310 and the second housing 320. Specifically, the processor 430 may determine the user's intention based on an angle varying speed contained in the angle-related information. For example, in response to identifying that the angle varying speed is smaller than a predetermined value, the processor 430 may select an external electronic device for outputting the content being outputted in the electronic device 300, and control the selected external electronic device to output the content. Also, in response to identifying that the angle varying speed is equal to or greater than the predetermined value, the processor 430 may terminate the output of the content and switch to an idle mode.

The above-described embodiments may be performed upon receiving a user gesture of folding the foldable housing 315. Alternatively or additionally, the above-described embodiments may be performed upon receiving a user input of pressing a specific button (e.g., a power button). FIGS. 5A to 5F are diagrams illustrating various examples of selecting an external electronic device for outputting content from among external electronic devices connected to an electronic device according to various embodiments of the disclosure.

Figure 5A:
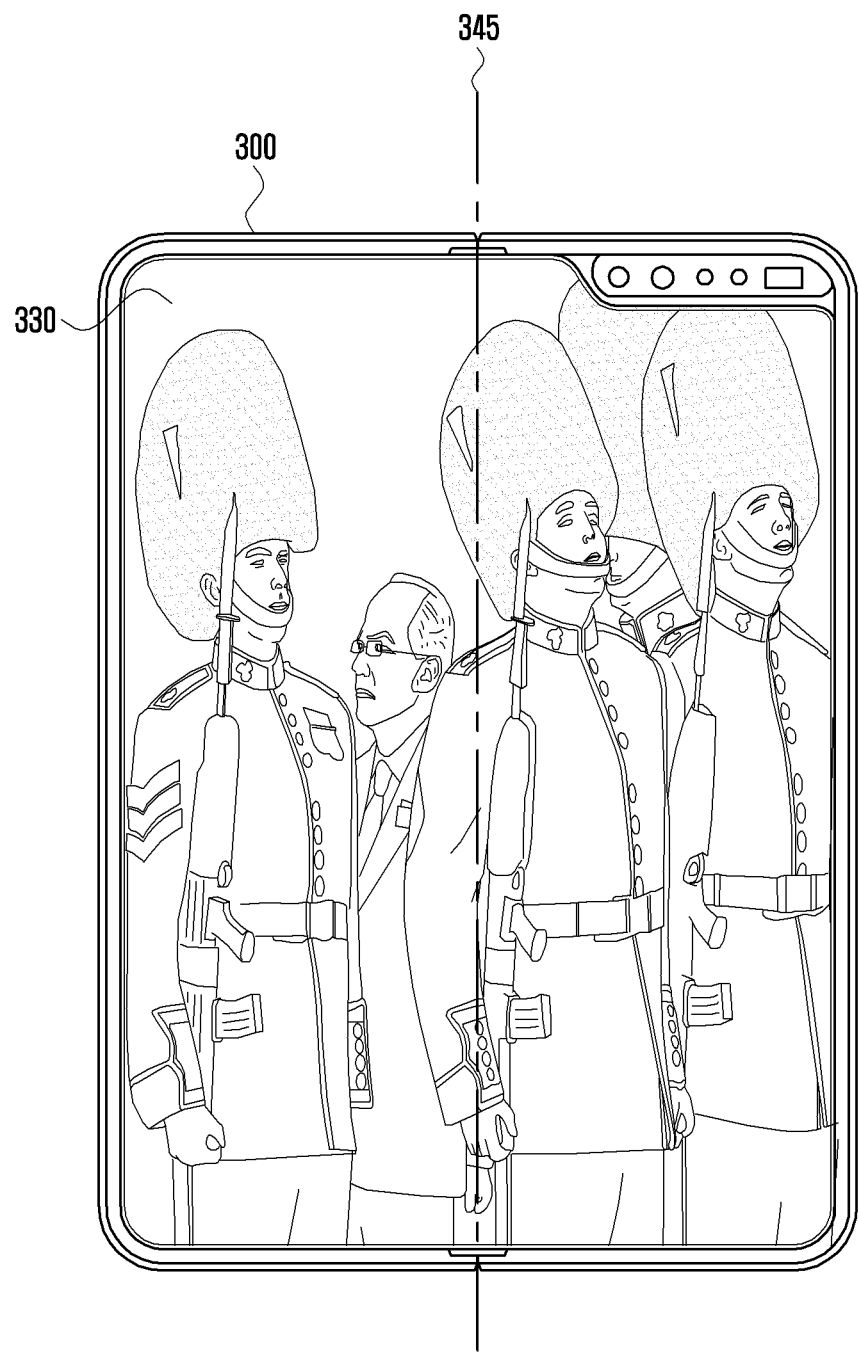
FIG. 5A, FIG. 5B, FIG. 5C, FIG. 5D, FIG. 5E, and FIG. 5F are diagrams illustrating various examples of selecting an external electronic device for outputting content from among external electronic devices connected to an electronic device according to various embodiments of the disclosure.
Figure 5B:
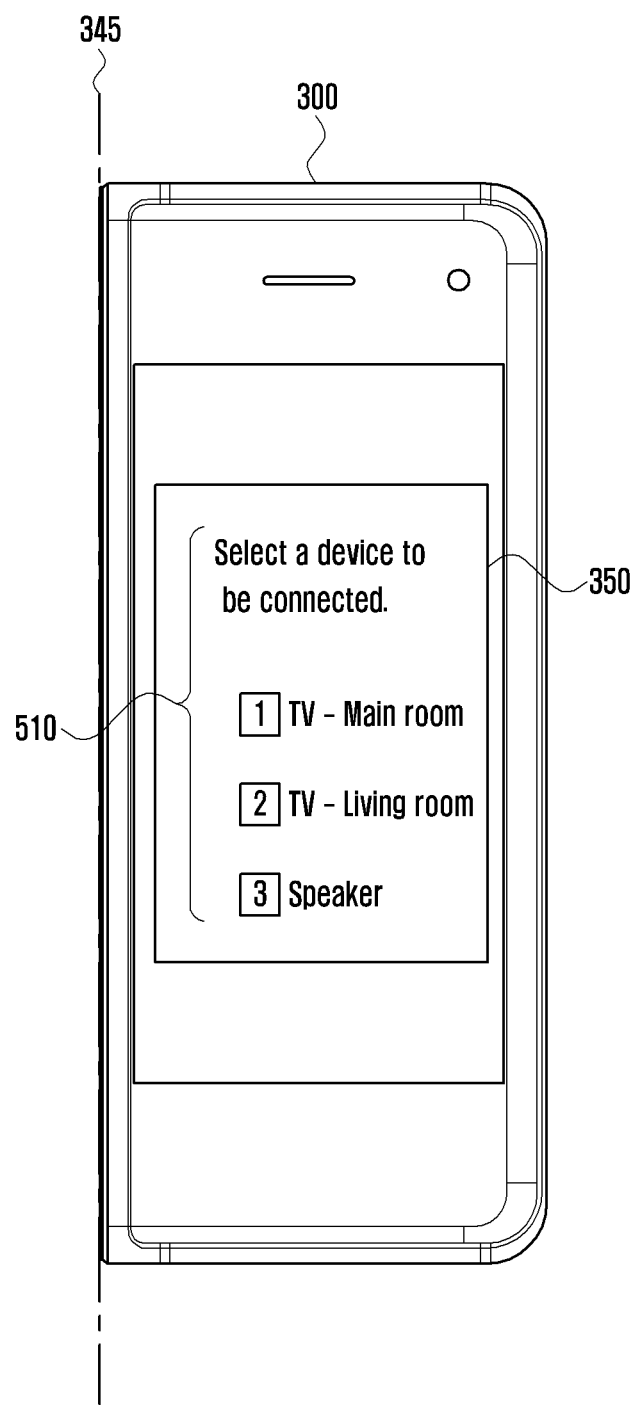

FIGS. 5A and 5B illustrate an electronic device (e.g., the electronic device 300 in FIG. 3) in the unfolded and folded states, respectively, according to an embodiment.

Referring to FIGS. 5A and 5B, the electronic device 300 includes a flexible housing (e.g., the foldable housing 315 in FIG. 3A) and a flexible display (e.g., the first display 330 in FIG. 3A). Because it includes such flexible materials, the electronic device 300 may be unfolded or folded about a center line 345. FIG. 5A shows the state in which the electronic device 300 is unfolded, and FIG. 5B shows the state in which the electronic device 300 is folded around the center line 345.

According to an embodiment, the electronic device 300 may receive a user gesture of folding the foldable housing 315 (or a user gesture of reducing an angle between the first housing 310 and the second housing 320 to less than a predetermined angle), and identify the status information of the electronic device 300 in response to receiving the user gesture.

According to an embodiment, the electronic device 300 may identify information about an application that is being executed when the user gesture is received. That is, for example, in response to receiving the user gesture of folding the foldable housing 315 while executing a content playback application, the electronic device 300 may determine that a user's intention is for content playback in an external electronic device. Then, the electronic device 300 may select an external electronic device to perform the content playback from among one or more external electronic devices connected thereto.

According to an embodiment, the electronic device 300 may control the second display 350 to display a list of external electronic devices thereon. Then, the electronic device 300 may select a particular external electronic device corresponding to a user input on the list displayed on the second display 350, and control the user-selected external electronic device to output the content.

According to various embodiments, the list of external electronic devices may be displayed in various forms.

Referring to FIG. 5B, the electronic device 300 may display the list of connectable external electronic devices on the second display 350 as text 510.

Figure 5C:
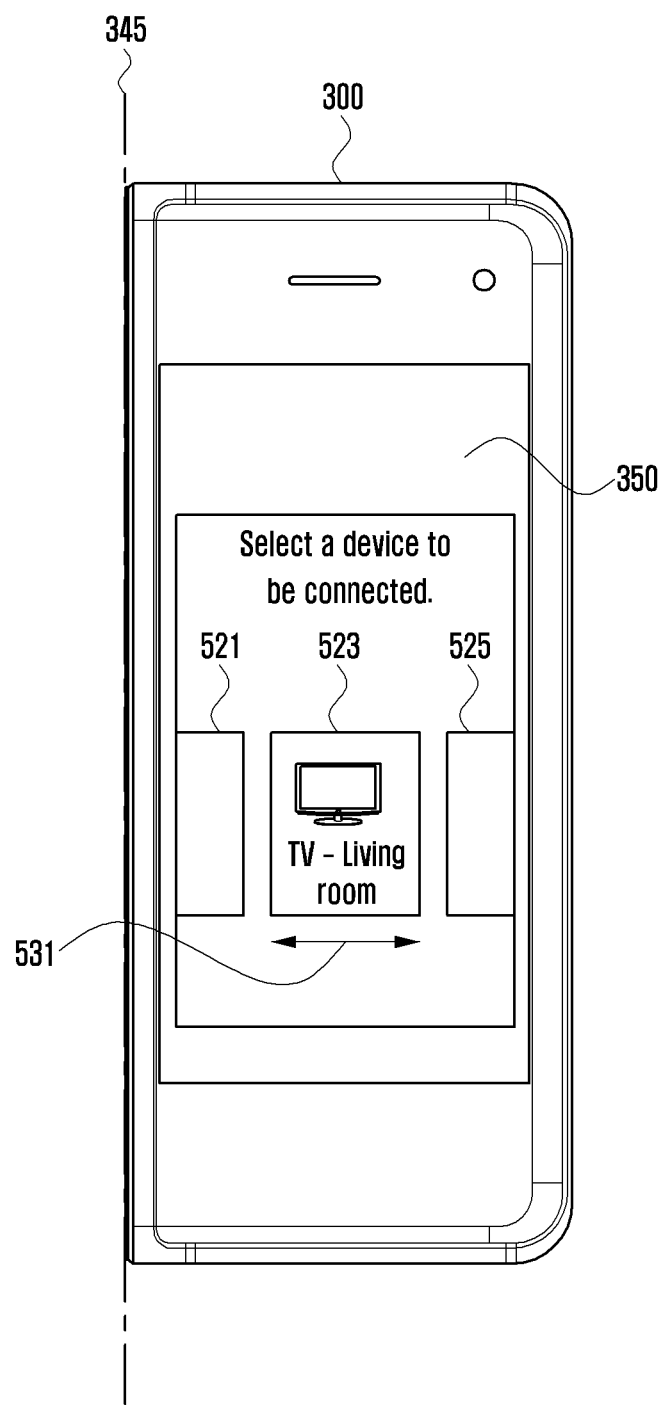

Referring to FIG. 5C, the electronic device 300 may display the list of connectable external electronic devices on the second display 350 as graphical objects 521, 523, and 525 in a graphic user interface (GUI). Then, the electronic device 300 may receive a user input for selecting one of the objects 521, 523, and 525. For example, the user may perform a swipe input on the object 523 in the direction 531. Upon receiving this input, the electronic device 300 may select a particular external electronic device corresponding to the user input as the external electronic device for outputting the content.

According to an embodiment, the electronic device 300 may determine the order of displaying the objects 521, 523, and 525 based on the locations of the external electronics with respect to the electronic device 300. For example, the electronic device corresponding to the object 521, which is displayed on the second screen 350 as being to the left of the object 523, may be to the left of the electronic device corresponding to the object 523 in real life.

Figure 5D:
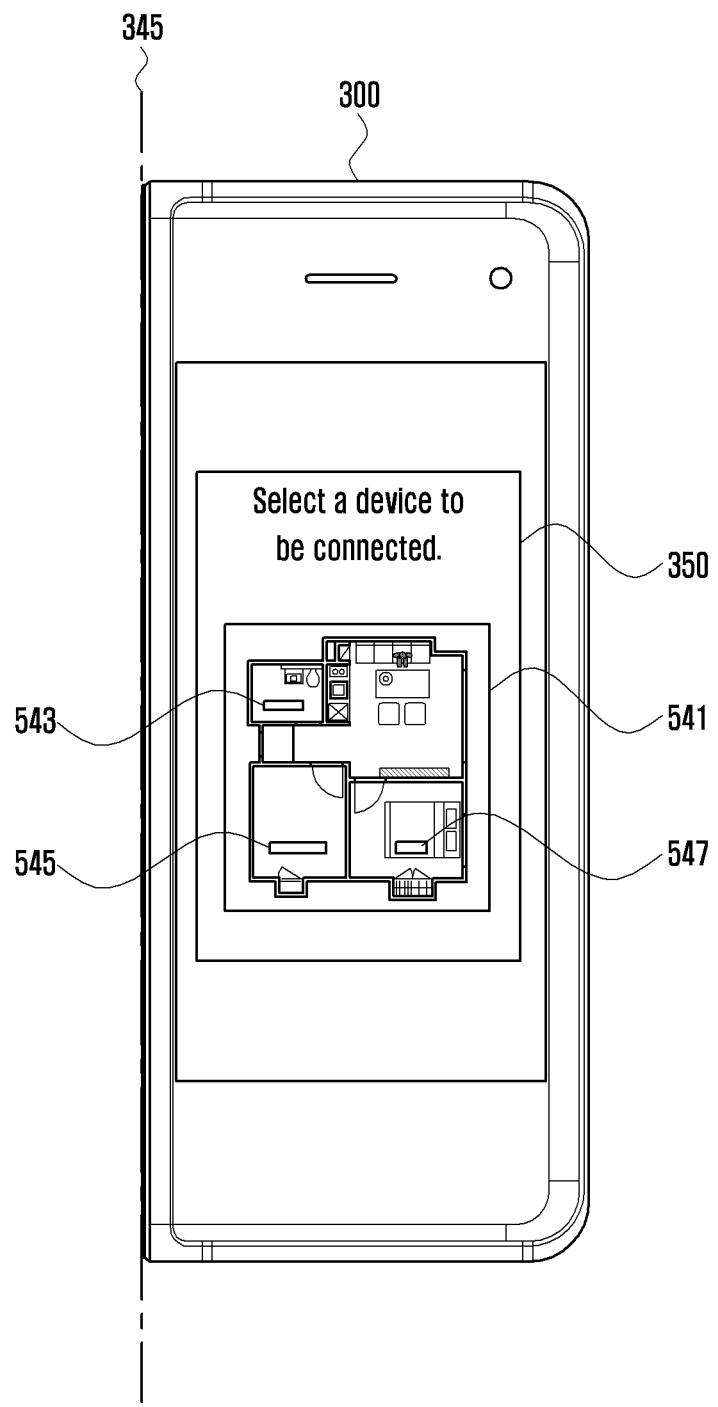

Referring to FIG. 5D, the electronic device 300 may display the list of connectable external electronic devices on a map 541. The map 541 may contain objects 543, 545, and 547 respectively disposed at the locations of corresponding external electronic devices. Then, the electronic device 300 may receive a user input for selecting one of the objects 543, 545, and 547, and select a particular external electronic device corresponding to the user input as the external electronic device for outputting the content.

Figure 5E:
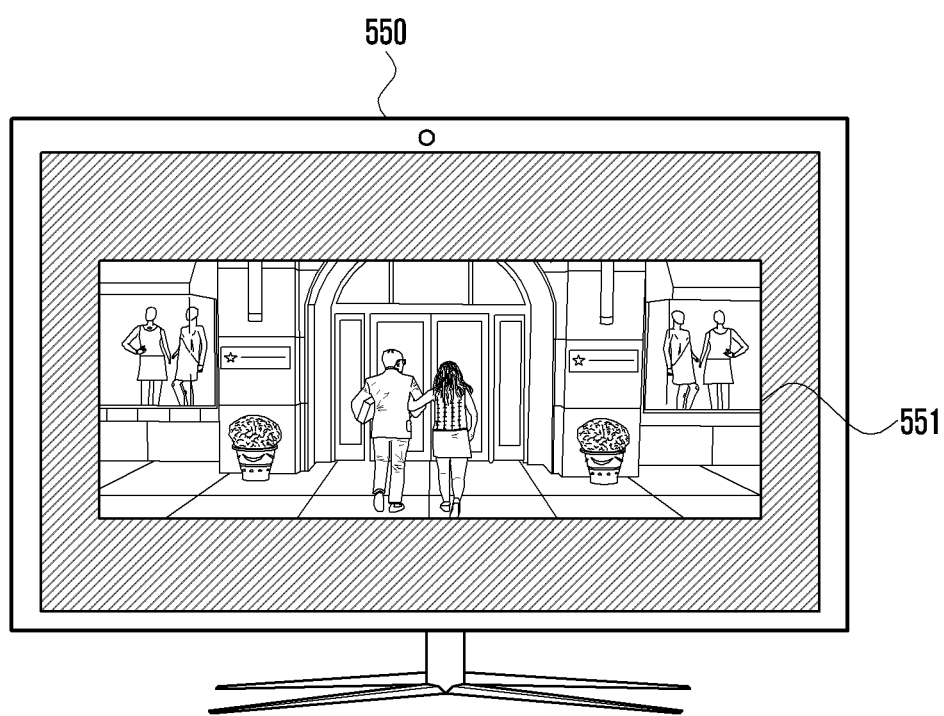

FIG. 5E is a diagram illustrating an external electronic device according to an embodiment of the disclosure.

Referring to FIG. 5E, the electronic device 300 according to an embodiment may control an external electronic device 550 selected per the above disclosure such that the selected external electronic device 500 outputs content (e.g. content previously displayed on the first display 330).

According to an embodiment, the electronic device 300 may transmit content stored on its memory (e.g., the memory 130 in FIG. 1) to the external electronic device 550, and control the external electronic device 550 to output the content. Then, the external electronic device 550 may output the content on a display 551 thereof.

According to another embodiment, the electronic device 300 may control the external electronic device 550 to download the content from an external server (not shown). Then, the external electronic device 550 may output the downloaded content.

Figure 5F:
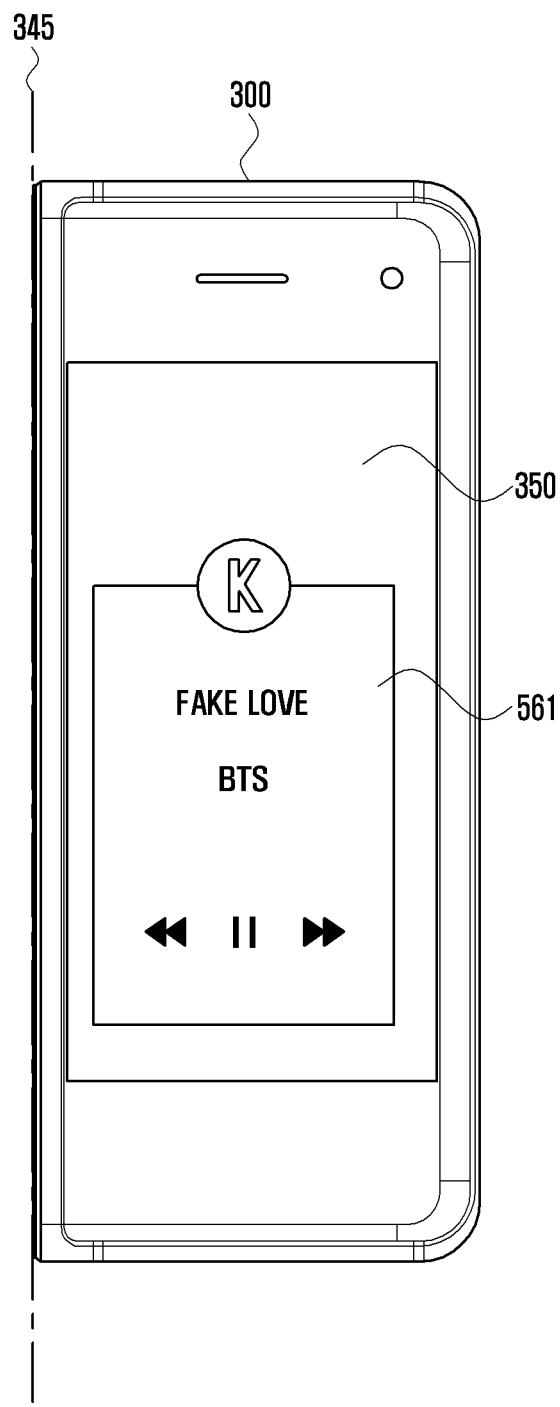

FIG. 5F is a diagram illustrating an example of displaying a screen for controlling an external electronic device at an electronic device according to an embodiment.

Referring to FIG. 5F, the electronic device 300 may select an external electronic device (e.g., the external electronic device 550 in FIG. 5E) for outputting the content, and display a screen 561 for controlling the external electronic device 550 on a second display (e.g., the second display 350). The screen 561 for controlling the external electronic device 550 may contain objects respectively corresponding to various functions that the external electronic device 550 can perform. For example, objects contained in the screen 561 may correspond to functions such as content playback, stopping content playback, and content playback speed adjustment. The electronic device 300 may control the external electronic device 550, based on user inputs to the objects displayed on the second display 350.

According to an embodiment, the electronic device 300 may also output, on the second display 350, a screen for selecting or confirming whether to download the content.

Figure 6A:
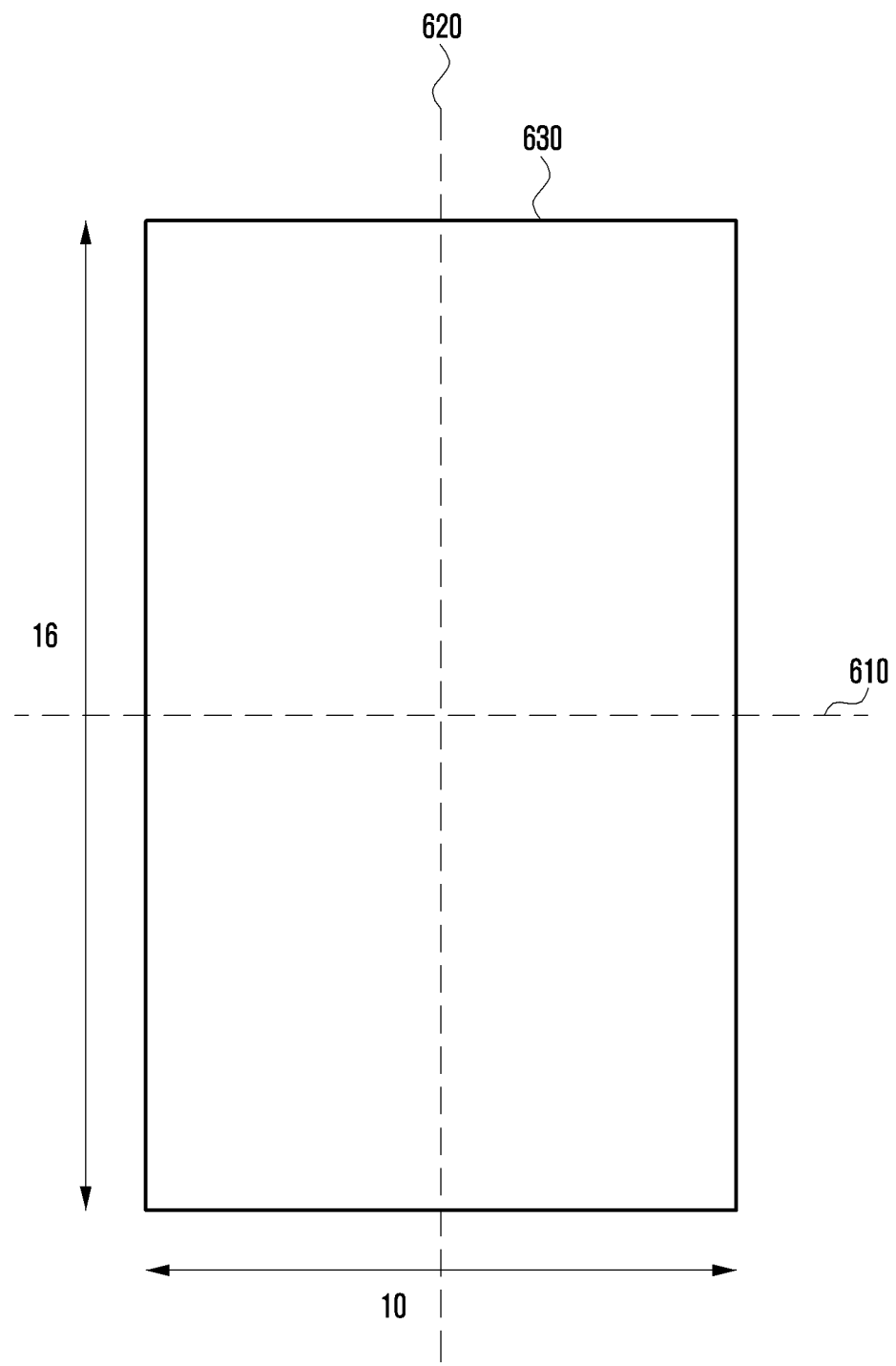
FIG. 6A, FIG. 6B, and FIG. 6C are diagrams illustrating examples of selecting an external electronic device for outputting content from among external electronic devices connected to an electronic device according to an embodiment of the disclosure.
Figure 6B:
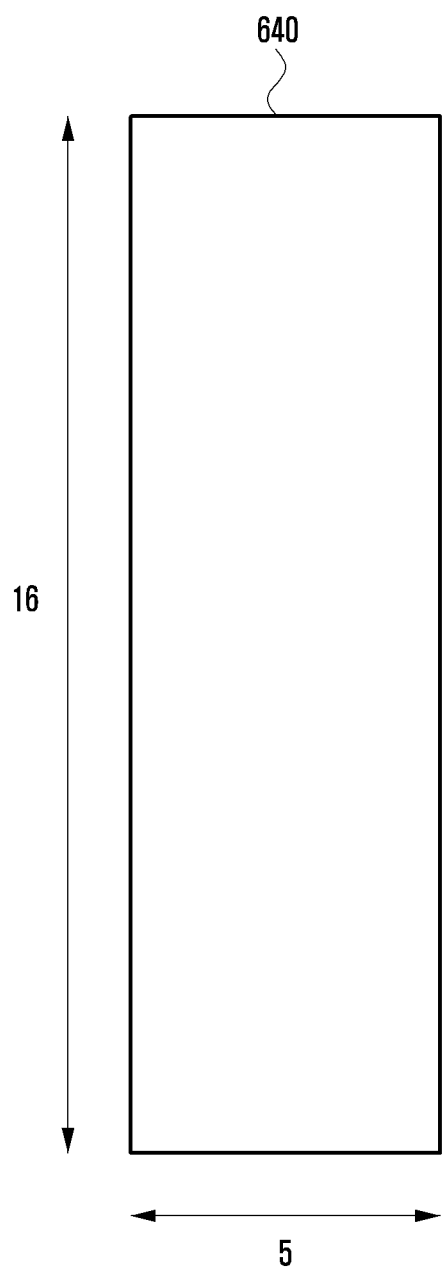
Figure 6C:
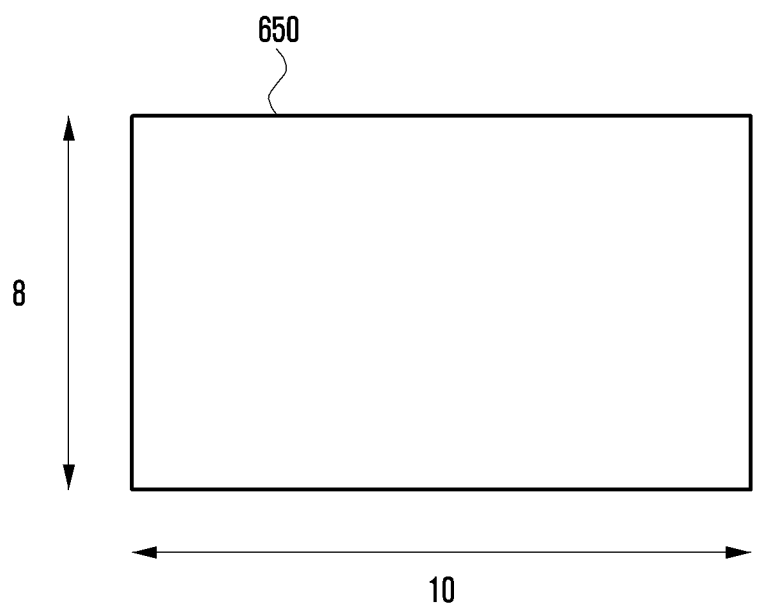

FIGS. 6A to 6C are diagrams illustrating examples of selecting an external electronic device for outputting content from among external electronic devices connected to an electronic device according to an embodiment of the disclosure.

The electronic device 300 according to an embodiment may include a flexible housing (e.g., the foldable housing 315 in FIG. 3A) and a flexible display (e.g., the first display 330 in FIG. 3A). Because of having such flexible materials, the electronic device 300 may be unfolded or folded in various ways.

Referring to FIG. 6A, the electronic device 300 may be folded in various ways. For example, the electronic device 300 may be folded about a first line 610 and/or a second line 620. When the electronic device 300 is folded about the second line 620, the first display (e.g., the first display 330 in FIG. 3A) may be folded to the size of a screen 640 shown in FIG. 6B. When the electronic device 300 is folded about the first line 610, the first display 330 may be folded to the size of a screen 650 shown in FIG. 6C.

According to an embodiment, the electronic device 300 may identify the aspect ratio of the content output screen 630 and the aspect ratio of the folded screen, which would be changed in response to the user input of folding the electronic device 300. For example, the aspect ratio (i.e., the proportional relationship between width and height) of the content output screen 630 may be 10:16. When the electronic device 300 is folded about the first line 610, the aspect ratio of the folded screen 650 may be 10:8. When the electronic device 300 is folded about the second line 620, the aspect ratio of the folded screen 640 may be 5:16.

According to an embodiment, the electronic device 300 may select an external electronic device for outputting the content from among one or more external electronic devices, based on the identified aspect ratio. Specifically, the electronic device 300 may compare the identified aspect ratio of the folded screen with the aspect ratio of each external electronic device included in information of external electronic devices stored in the memory (e.g., the memory 130 in FIG. 1), and select a particular external electronic device having the most similar aspect ratio to the identified aspect ratio. Then, the electronic device 300 may control the selected external electronic device to output the content.

According to an embodiment, the user of the electronic device 300 may fold the electronic device 300 in a way that corresponds to a particular external electronic device, with the intention of connecting to the particular external electronic device. The electronic device 300 may receive the user gesture of folding the foldable housing 315 and determine the user's intention corresponding to the received user gesture. For example, the electronic device 300 may receive a user gesture of folding the foldable housing 315 with respect to the first line 610 and identify that the user intended for the external electronic device corresponding to the aspect ratio of screen 650 to be selected. This corresponding external electronic device may be an external electronic device, among a plurality of external electronic devices, having an aspect ratio that is most similar to the aspect ratio of the screen 650. As such, the user may select a desired external electronic device for outputting the content through different ways of folding the foldable housing 315 Although FIGS. 6A to 6C show examples of folding the electronic device 300 only once, various embodiments of the disclosure may also be applied to other examples of folding the electronic device 300 two or more times. When the electronic device 300 is folded more than once, the electronic device 300 may select, as the external electronic device for outputting content, a particular external electronic device having an aspect ratio most similar to that of a screen finally produced by folding the electronic device 300.

Figure 7A:
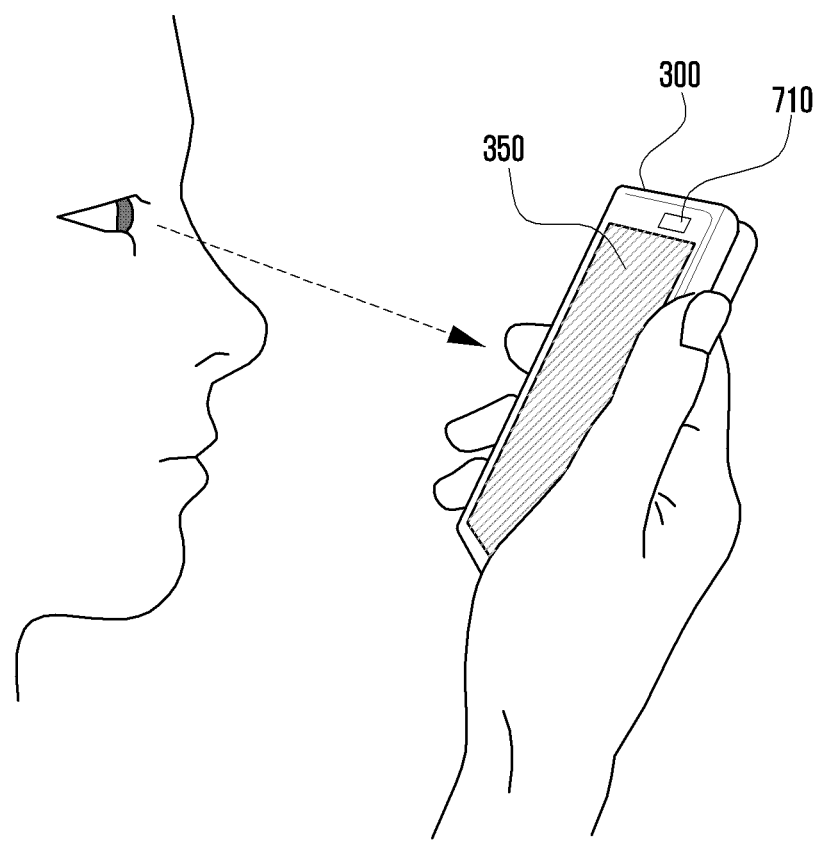
FIG. 7A ad FIG. 7B are diagrams illustrating examples of determining a user's intention through various components of an electronic device according to various embodiments of the disclosure.
Figure 7B:
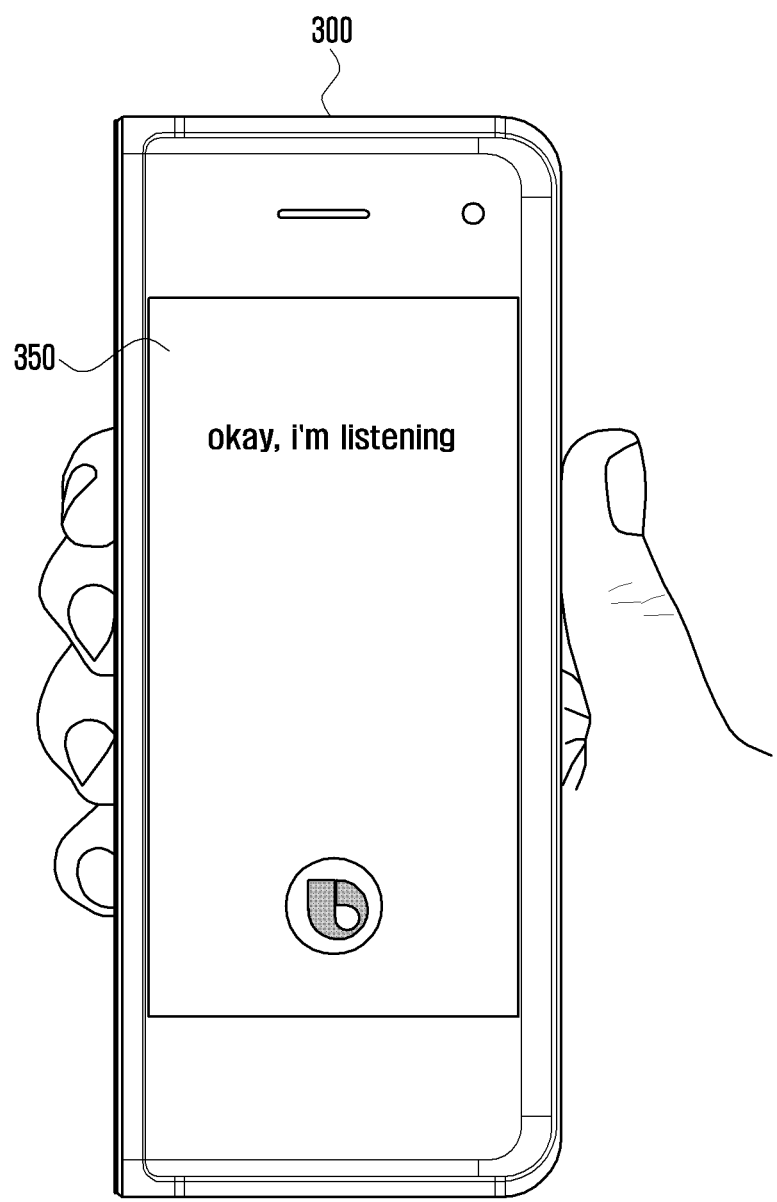

FIGS. 7A and 7B are diagrams illustrating examples of determining a user's intention through various components of an electronic device according to various embodiments of the disclosure.

FIG. 7A illustrates an example of determining, at an electronic device (e.g., the electronic device 300 in FIGS. 3A to 3D) according to an embodiment, the user's intention by using a camera 710 (e.g., the camera module 180 in FIG. 1) included in the electronic device 300.

Referring to FIG. 7A, the electronic device 300 may receive a user gesture of folding the foldable housing 315, activate the camera 710, and track the user's gaze. The camera 710 may be disposed adjacent to a second display (e.g., the second display 350 in FIG. 3B). An image photographed by the camera 710 is not displayed on the second display 350 but merely used by the electronic device 300. Using the image photographed by the camera 710, the electronic device 300 may identify whether the user is gazing at the electronic device 300 after the user gesture to fold the device.

According to an embodiment, in response to identifying that the user is gazing at the electronic device 300, the electronic device 300 may determine that the user's intention is not to switch the electronic device 300 to an idle mode, but rather to perform an additional operation using the electronic device 300. For example, the electronic device 300 may determine that the user's intention is a request for displaying a screen associated with a currently executed application on the second display 350, and then display the associated screen on the second display 350. In another example, the electronic device 300 may determine that the user's intention is a request for displaying a screen associated with a currently executed content playback application on the second display 350, and then display the associated screen on the second display 350. In still another example, the electronic device 300 may determine that the user's intention is a request for displaying a screen associated with control of a currently connected external electronic device on the second display 350, and then display the associated screen on the second display 350. Then, the electronic device 300 may control the currently connected external electronic device to play back the content.

FIG. 7B is a diagram illustrating an example of determining, at an electronic device (e.g., the electronic device 300 in FIGS. 3A to 3D) according to an embodiment, a user's intention by using a microphone (e.g., the input device 150 in FIG. 1) included in the electronic device 300.

Referring to FIG. 7B, the electronic device 300 may receive a user gesture of folding the foldable housing 315 and then determine whether an additional user input for executing a voice-based intelligent assistant service (or a voice recognition application) is received. The voice-based intelligent assistant service may refer to a service capable of performing various operations of the electronic device 300 based on the user's voice input. The electronic device 300 may receive an additional user input for executing another application and performing operations through the voice-based intelligent assistant service. This additional user input may be received via, for example, a physical button, a touch pad, a voice input, or a remote input.

According to an embodiment, when receiving the additional user input for executing the voice-based intelligent assistant service, the electronic device 300 may determine that the user's intention is not to switch the electronic device 300 to an idle mode, but rather to perform an additional operation using the electronic device 300. For example, the electronic device 300 may determine that the user's intention is a request for displaying a screen associated with a currently executed application on the second display 350, and then display the associated screen on the second display 350. In another example, the electronic device 300 may determine that the user's intention is a request for displaying a screen associated with a currently executed content playback application on the second display 350, and then display the associated screen on the second display 350. In yet another example, the electronic device 300 may select a particular external electronic device for performing a playback of currently executed content, and the control the selected external electronic device to play back the content.

FIGS. 7A and 7B illustrate operations of determining the user's intention by using the microphone or the camera 710 of the electronic device 300. Alternatively or additionally, any sensor other than the microphone or the camera 710 may be used by the electronic device 300 to determine the user's intention. For example, the electronic device 300 may determine the user's intention by using a grip sensor or a gyro sensor. In another example, the electronic device 300 may determine the user's intention based on whether a user input for pressing a specific button (e.g., a power button) of the electronic device 300 is received. In addition, the electronic device 300 may determine the user's intention based on information collected by at least two of the sensors of the electronic device 300, and then perform a particular operation corresponding to the user's intention.

Figure 8A:
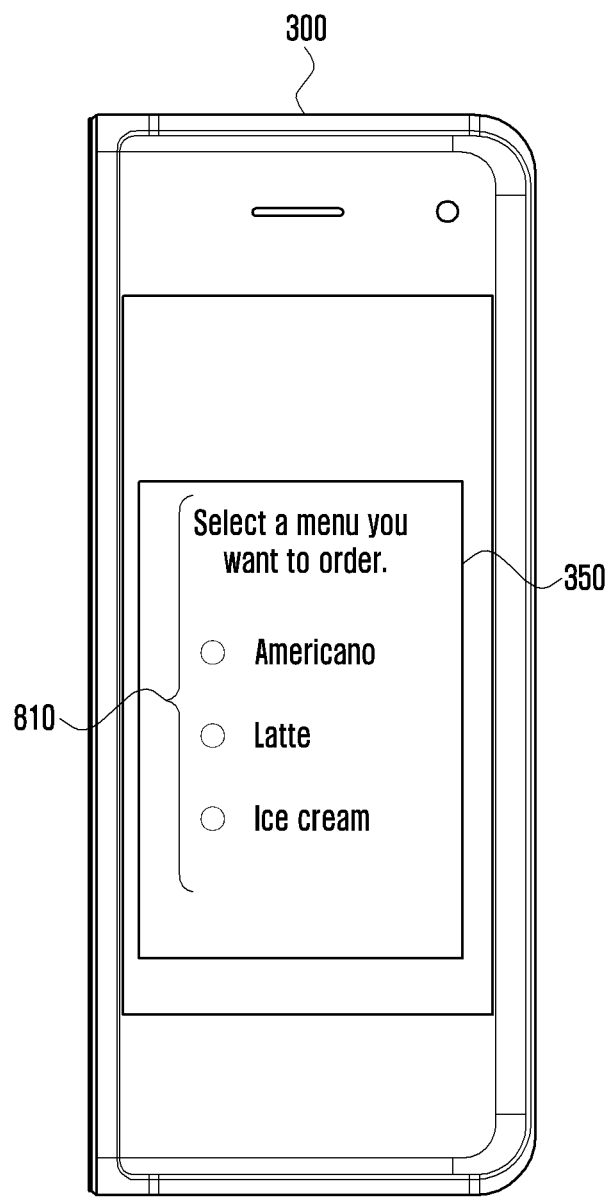
FIG. 8A and FIG. 8B are diagrams illustrating examples of determining a user's intention based on a location of an electronic device according to an embodiment of the disclosure.
Figure 8B:
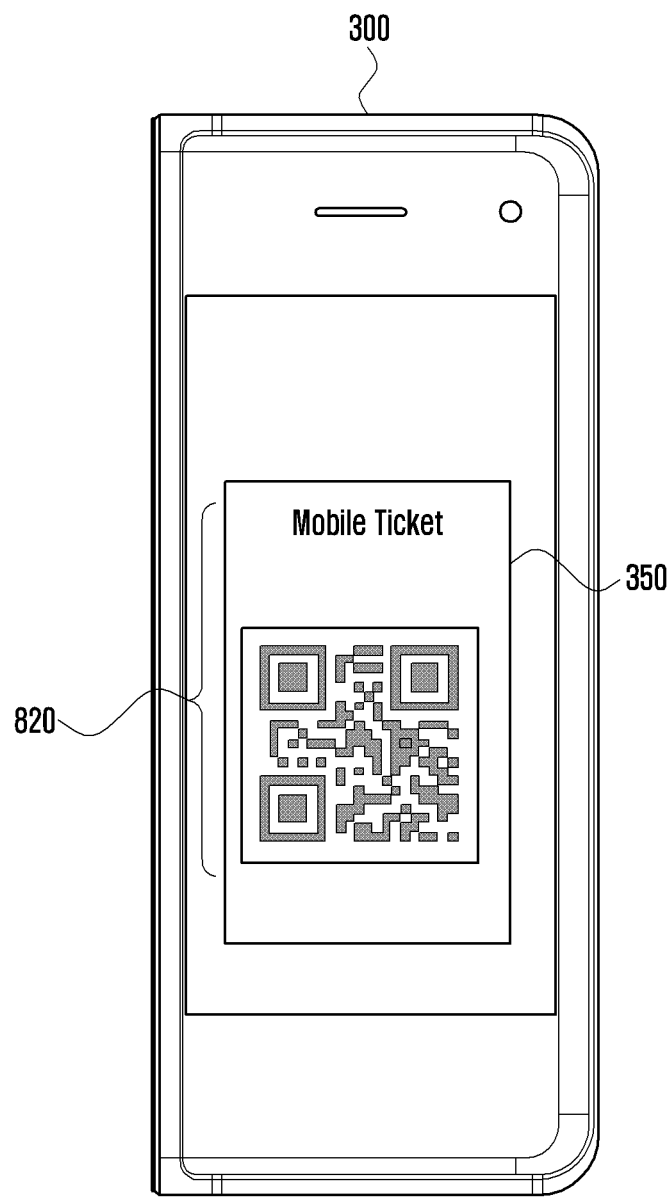

FIGS. 8A and 8B are diagrams illustrating examples of determining a user's intention based on a location of an electronic device according to an embodiment of the disclosure.

According to an embodiment, an electronic device (e.g., 300 in FIG. 3A) may identify location information thereof. The location information of the electronic device 300 may be identified by a GPS module or a GNSS module included in the electronic device 300. According to another embodiment, the location information of the electronic device 300 may be identified based on information of a network to which the electronic device 300 is connected.

According to an embodiment, based on the identified location information, the electronic device 300 may identify the type of place where the electronic device 300 is located. For example, such place types may be classified into shopping mall, department store, café, restaurant, and the like.

According to an embodiment, based on the location information of the electronic device 300, the electronic device 300 may determine the user's intention for the user gesture of folding the foldable housing 315 and perform a particular operation corresponding to the user's intention.

According to an embodiment, based on the location information of the electronic device 300, the electronic device 300 may execute an application associated with the place where the electronic device 300 is located. Also, the electronic device 300 may control the second display 350 to display a screen associated with the executed application thereon.

Referring to FIG. 8A, when the electronic device 300 is located in a café, the electronic device 300 may execute an application for ordering food or drink in the café. The electronic device 300 may display a screen 810 associated with the executed application on the second display 350. In FIG. 8A, the screen 810 displays a menu for selecting food or drink to be ordered in the café is displayed on the second display 350.

Referring to FIG. 8B, in response to identifying that the electronic device 300 is located in an airport, the electronic device 300 may execute an application for issuing an airline ticket. Then, the electronic device 300 may display a screen 820 associated with the airline ticket on the second display 350. In FIG. 8B, the screen 820 containing the issued airline ticket in the form of QR code is displayed on the second display 350.

According to another embodiment, in response to receiving the user's additional input (e.g., a user input of gazing at the electronic device 300), the electronic device 300 may display a screen associated with an executed application on the second display 350 as in the embodiments described with reference to FIGS. 7A and 7B.

According to an embodiment of the disclosure, an electronic device may include a foldable housing including a first housing structure and a second housing structure foldably connected to the first housing structure; a flexible display disposed in the foldable housing; a display disposed on a first surface of the first housing structure or the second housing structure, the first surface being opposite to a second surface of the foldable housing on which the flexible display is disposed; and a processor. The processor may be configured to detect a folding of the foldable housing caused by a user gesture, to identify status information of the electronic device in response to detecting the folding of the foldable housing, to determine a user's intention for the user gesture, based on both the user gesture and the status information of the electronic device, and to perform a particular operation corresponding to the user's intention.

In the electronic device according to an embodiment, the status information of the electronic device may include information regarding an application being executed when the user gesture is received, and the processor may be further configured to determine the user's intention, based on the information regarding the application.

In the electronic device according to an embodiment, the processor may be further configured to, when the application being executed is a content playback application, control an external electronic device to output content being played back at the electronic device.

In the electronic device according to an embodiment, the processor may be further configured to select the external electronic device from among a plurality of external electronic devices connected to the electronic device based on characteristics of the content being played back and characteristics of each of the plurality of external electronic devices.

In the electronic device according to an embodiment, the processor may be further configured to identify an aspect ratio of a content output screen changed by the user gesture, and to select an external electronic device for outputting content from among a plurality of external electronic devices based on the aspect ratio.

In the electronic device according to an embodiment, the processor may be further configured to display, on the display, a screen for receiving a user input for controlling an external electronic device or a list of at least one external electronic device to play back content.

In the electronic device according to an embodiment, the processor may be further configured to determine the user's intention, based on location information of the electronic device detected by a location measuring sensor included in the electronic device.

In the electronic device according to an embodiment, the processor may be further configured to execute an application associated with a location of the electronic device, based on the location information, and to display a screen associated with the executed application on the display.

In the electronic device according to an embodiment, the status information of the electronic device may include battery status information of the electronic device, and the processor may be further configured to determine the user's intention based on the battery status information.

The electronic device according to an embodiment may further include a camera capable of photographing a user's face, a microphone capable of receiving a user's voice, and/or a sensor capable of detecting movement of the electronic device, and the processor may be further configured to determine the user's intention, based on information obtained from the camera, the microphone, and/or the sensor.

The electronic device according to an embodiment may further include a hinge disposed between the first housing structure and the second housing structure and configured to allow rotation of the first housing structure or rotation of the second housing structure, and the processor may be further configured to determine the user's intention, based on information associated with an angle between the first and second housing structures.

According to an embodiment of the disclosure, an electronic device may include a foldable housing; a communication module; a flexible display disposed in the foldable housing; a display disposed on a first surface of the foldable housing opposite to a second surface of the foldable housing on which the flexible display is disposed; and a processor. The foldable housing may include a first housing structure; and a second housing structure foldably connected to the first housing structure. The first housing structure and the second housing structure may be foldable about an axis so that the second housing structure may face the first housing structure in a folded state. The first and second housing structures may form a planar structure in an unfolded state. The processor may be configured to detect folding of the foldable housing caused by a user gesture, to identify status information of the electronic device in response to detecting the folding of the foldable housing, to determine a user's intention for the user gesture, based on both the user gesture and the status information of the electronic device, to select an external electronic device to be connected to the electronic device, based on the user's intention, to control the communication module to be connected to the selected external electronic device, and to control the display to display a screen associated with control of the external electronic device.

Figure 9:
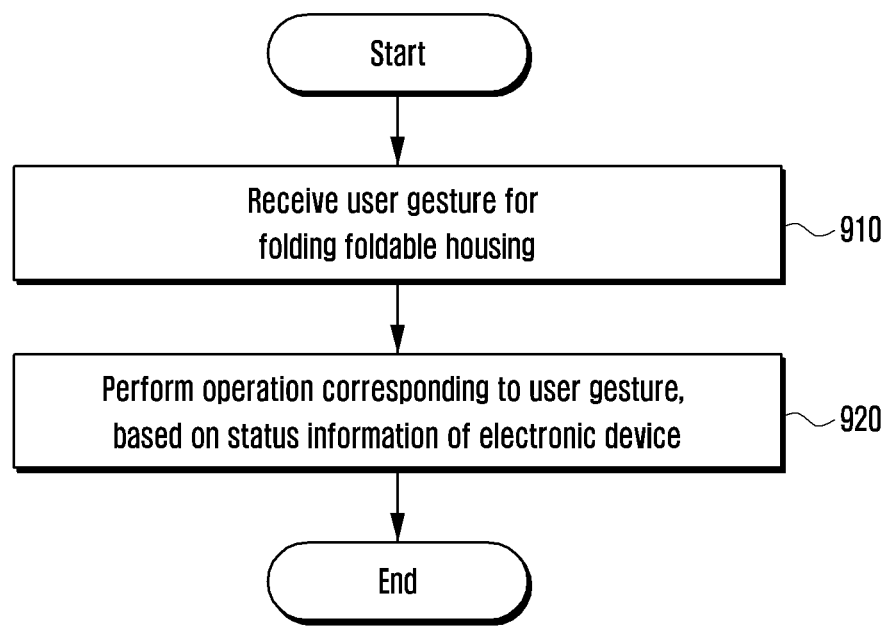
FIG. 9 is a flow diagram illustrating an operating method of an electronic device according to an embodiment of the disclosure.

FIG. 9 is a flow diagram illustrating an operating method of an electronic device according to an embodiment of the disclosure.

According to an embodiment, at operation 910, an electronic device (e.g., the electronic device 300 in FIG. 3A) may receive a user gesture for folding a foldable housing (e.g., the foldable housing 315 in FIG. 3A).

According to an embodiment, the user gesture for folding the foldable housing 315 may refer to a user action that reduces an angle between a first housing (e.g., the first housing 310 in FIG. 3A) and a second housing (e.g., the second housing 320 in FIG. 3B) to less than a predetermined angle.

According to an embodiment, at operation 920, the electronic device 300 may perform a particular operation corresponding to the user gesture, based on status information of the electronic device 300. The status information of the electronic device 300 may be used to determine the particular operation corresponding to the user gesture. A detailed embodiment will be described below with reference to FIG. 10.

Figure 10:
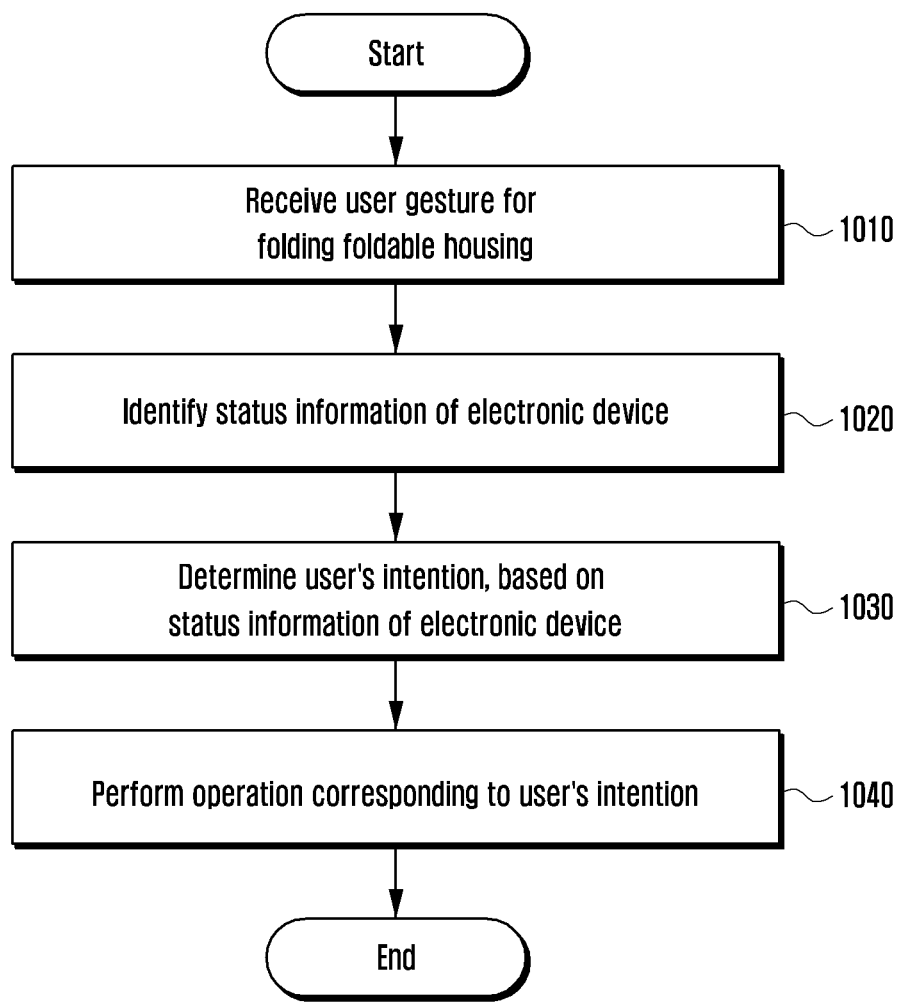
FIG. 10 is a flow diagram illustrating an operating method of an electronic device according to an embodiment of the disclosure.

FIG. 10 is a flow diagram illustrating an operating method of an electronic device according to an embodiment of the disclosure.

According to an embodiment, at operation 1010, an electronic device (e.g., the electronic device 300 in FIG. 3A) may receive a user gesture for folding a foldable housing (e.g., the foldable housing 315 in FIG. 3A).

According to an embodiment, the user gesture for folding the foldable housing 315 may refer to a user action that reduces an angle between a first housing (e.g., the first housing 310 in FIG. 3A) and a second housing (e.g., the second housing 320 in FIG. 3B) to less than a predetermined angle. In contrast, a user action that increases the angle between the first housing 310 and the second housings 320 to more than the predetermined angle may be a user gesture for unfolding the foldable housing 315.

According to an embodiment, at operation 1020, the electronic device 300 may identify status information thereof in response to receiving the user gesture.

According to an embodiment, the status information of the electronic device 300 may include information regarding an application being executed when the user gesture for folding the foldable housing 315 is received. Such information of an executed application may include information about the type of application (e.g., video playback application, music player application, document editor application, document viewer application, etc.).

According to an embodiment, the electronic device 300 may determine the user's intention at operation 1030, based on the status information thereof, and then perform a particular operation corresponding to the user's intention at operation 1040.

According to an embodiment, in response to receiving the user gesture for folding the foldable housing 315 while executing a content playback application, the electronic device 300 may determine that the user's intention is content playback in an external electronic device. Then, the electronic device 300 may select a particular external electronic device for performing the content playback from among one or more external electronic devices connected to the electronic device 300. In addition, the electronic device 300 may control the selected external electronic device to perform the content playback.

According to an embodiment, based on location information of the electronic device 300 included in the status information of the electronic device 300, the electronic device 300 may determine the user's intention for the user gesture of folding the foldable housing 315. Then, based on the location information of the electronic device 300, the electronic device 300 may execute an application associated with the place where the electronic device 300 is located. Also, the electronic device 300 may control the second display 350 to display a screen associated with the executed application thereon.

According to an embodiment, depending on different status information of the electronic device 300, the electronic device 300 may determine different user's intentions. Therefore, even when receiving the same user gesture, the electronic device 300 may recognize different user's intentions based on the status information of the electronic device 300 and then perform different operations corresponding to the different intentions.

Figure 11:
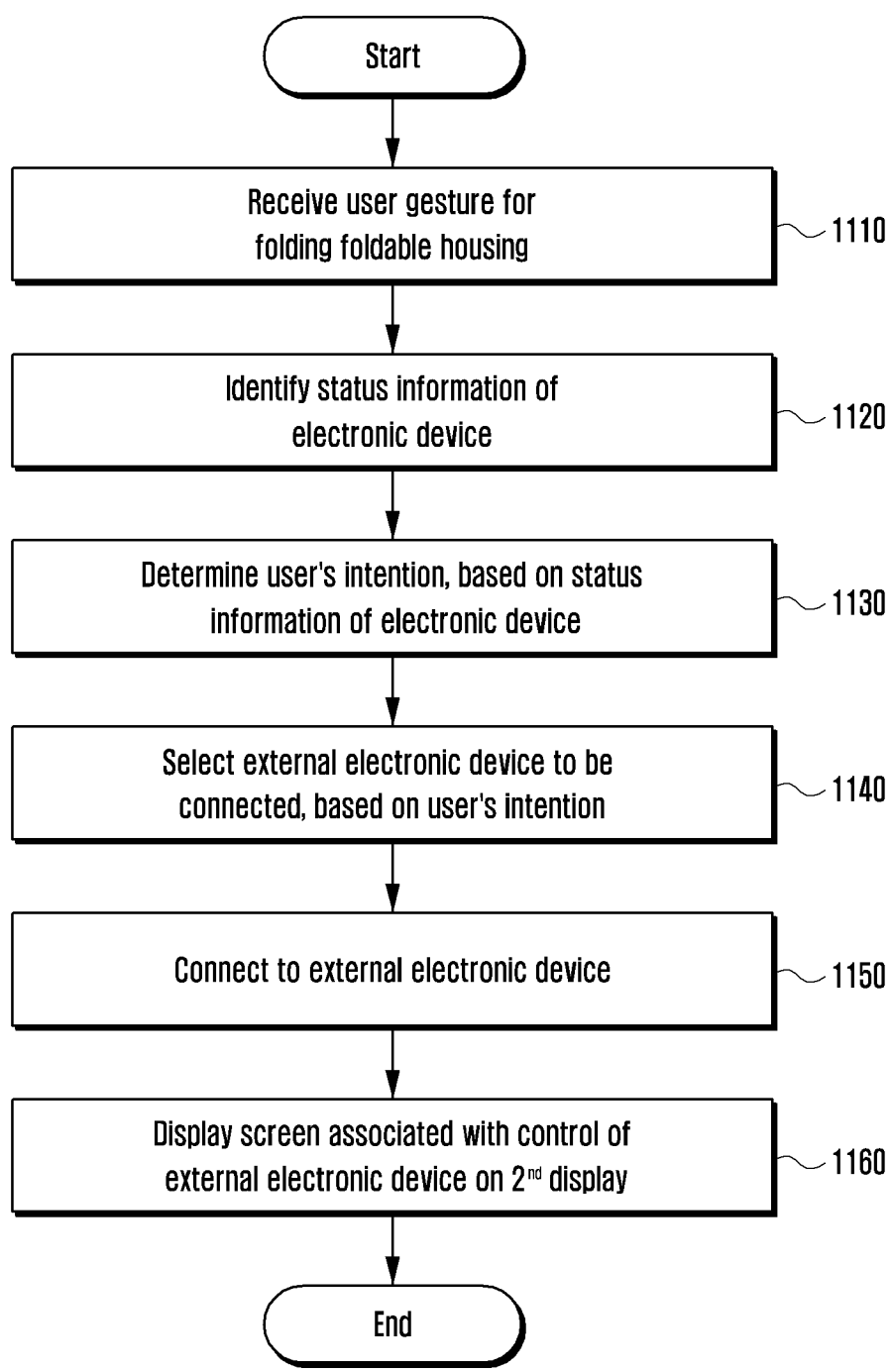
FIG. 11 is a flow diagram illustrating an operating method of an electronic device according to an embodiment of the disclosure.

FIG. 11 is a flow diagram illustrating an operating method of an electronic device according to an embodiment of the disclosure.

According to an embodiment, at operation 1110, an electronic device (e.g., the electronic device 300 in FIG. 3A) may receive a user gesture for folding a foldable housing (e.g., the foldable housing 315 in FIG. 3A).

According to an embodiment, the user gesture for folding the foldable housing 315 may refer to a user action that reduces an angle between a first housing (e.g., the first housing 310 in FIG. 3A) and a second housing (e.g., the second housing 320 in FIG. 3B) to less than a predetermined angle. In contrast, a user action that increases the angle between the first housing 310 and the second housings 320 to more than the predetermined angle may mean a user gesture for unfolding the foldable housing 315.

According to an embodiment, at operation 1120, the electronic device 300 may identify status information thereof in response to receiving the user gesture.

According to an embodiment, the status information of the electronic device 300 may include information regarding an application being executed when the user gesture for folding the foldable housing 315 is received. Such information of an executed application may include information about the type of application (e.g., video playback application, music player application, document editor application, document viewer application, etc.).

According to an embodiment, the electronic device 300 may determine the user's intention at operation 1130, based on the status information thereof, and then perform a particular operation corresponding to the user's intention at operation 1140.

According to an embodiment, in response to receiving the user gesture for folding the foldable housing 315 while executing a content playback application, the electronic device 300 may determine that the user's intention is content playback in an external electronic device. Then, the electronic device 300 may select a particular external electronic device for performing the content playback from among one or more external electronic devices connected to the electronic device 300.

According to an embodiment, at operation 1150, the electronic device 300 may connect the selected external electronic device and then control the selected external electronic device to output the content.

According to an embodiment, at operation 1160, the electronic device 300 may display a screen associated with control of the external electronic device on the second display 350.

According to an embodiment, the electronic device 300 may receive a user input from the screen associated with control of the external electronic device displayed on the second display 350. Then, the electronic device 300 may control the external electronic device to perform the particular operation corresponding to the received user input.

According to an embodiment of the disclosure, an operating method of an electronic device may include detecting a folding of a foldable housing caused by a user gesture, the foldable housing including a first housing structure and a second housing structure foldably connected to the first housing structure; identifying status information of the electronic device in response to detecting the folding of the foldable housing; determining a user's intention for the user gesture, based on both the user gesture and the status information of the electronic device; and performing a particular operation corresponding to the user's intention.

In the method according to an embodiment, the status information of the electronic device may include information regarding an application being executed when the user gesture is received, and the method may further include determining the user's intention, based on the information regarding the application.

In the method according to an embodiment, the performing of the particular operation corresponding to the user's intention may include, when the application being executed is a content playback application, controlling an external electronic device, connected to the electronic device, to output content being played back by the application.

In the method according to an embodiment, the method may further include selecting the external electronic device from among a plurality of external electronic devices connected to the electronic device based on characteristics of the content being played back and characteristics of each of the plurality of external electronic devices.

In the method according to an embodiment, the method may further include identifying an aspect ratio of a content output screen changed by the user gesture; and selecting an external electronic device for outputting content from among a plurality of external electronic devices based on the aspect ratio.

In the method according to an embodiment, the method may further include displaying, on a display disposed on a first surface of the foldable housing opposite to a second surface of the foldable housing on which a flexible display structure is disposed, a screen for receiving a user input for controlling an external electronic device or a list of at least one external electronic device to play back content.

In the method according to an embodiment, the status information of the electronic device may include location information of the electronic device detected by a location measuring sensor included in the electronic device, and the method may further include determining the user's intention based on the location information.

In the method according to an embodiment, the method may further include executing an application associated with a location of the electronic device, based on the location information; and displaying a screen associated with the executed application on a display disposed on a first surface of the foldable housing opposite to a second surface of the foldable housing on which the flexible display structure is disposed.

In the method according to an embodiment, the status information of the electronic device includes battery status information of the electronic device, and the method may further include determining the user's intention, based on the battery status information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    a foldable housing including a first housing structure and a second housing structure foldably connected to the first housing structure;
    a flexible display disposed in the foldable housing;
    a display disposed on a first surface of the first housing structure or the second housing structure, the first surface being opposite to a second surface of the foldable housing on which the flexible display is disposed; and
    a processor configured to:
        detect a folding of the foldable housing while a content is displayed on the flexible display,
        identify status information of the electronic device, the status information of the electronic device including information regarding a characteristic of the content,
        in response to detecting the folding of the foldable housing, identify at least one external electronic device to display the content based on the status information,
        display a selection screen on the display for receiving a user input for selecting one of the identified external electronic device, the selection screen including a list of the identified external electronic device to output the content, and
        transmit a control signal for displaying the content on the selected external electronic device to the selected external electronic device.

2. The electronic device of claim 1, wherein the processor is further configured to:
    select an external electronic device from among the identified external electronic device connected to the electronic device based on the characteristics of the content and characteristics of the identified external electronic device.

3. The electronic device of claim 1, wherein the processor is further configured to:
    identify an aspect ratio of a content output screen changed by a user gesture, and
    select an external electronic device for displaying content from among the identified external electronic device, based on the aspect ratio.

4. The electronic device of claim 1, wherein the processor is further configured to:
    display, on the display, a screen for receiving a user input for controlling an external electronic device or a list of at least one external electronic device to play back content.

5. The electronic device of claim 1, wherein the processor is further configured to:
    determine a particular operation to perform based on location information of the electronic device detected by a location measuring sensor included in the electronic device.

6. The electronic device of claim 5, wherein the processor is further configured to:
- execute an application associated with a location of the electronic device, based on the location information, and
- display a screen associated with the executed application on the display.

7. The electronic device of claim 1, wherein the status information of the electronic device includes battery status information of the electronic device and available communication status information for the electronic device, and
- wherein the processor is further configured to:
  - determine a particular operation to perform, based on the battery status information or the available communication status information.

8. The electronic device of claim 1, further comprising:
- a camera capable of photographing a user's face, a microphone capable of receiving a user's voice, and/or a sensor capable of detecting movement of the electronic device,
- wherein the processor is further configured to:
  - determine a particular operation to perform based on information obtained from the camera, the microphone, and/or the sensor.

9. The electronic device of claim 1, further comprising:
- a hinge disposed between the first housing structure and the second housing structure and configured to allow rotation of the first housing structure or rotation of the second housing structure,
- wherein the processor is further configured to determine a particular operation to perform based on information associated with an angle between the first housing structure and the second housing structure.

10. An electronic device comprising:
- a foldable housing;
- a communication module;
- a flexible display disposed in the foldable housing;
- a display disposed on a first surface of the foldable housing opposite to a second surface of the foldable housing on which the flexible display is disposed; and
- a processor,
- wherein the foldable housing includes:
  - a first housing structure; and
  - a second housing structure foldably connected to the first housing structure,
- wherein the first housing structure and the second housing structure are foldable about an axis so that the second housing structure faces the first housing structure in a folded state, and the first housing structure and second housing structure form a planar structure in an unfolded state, and
- wherein the processor is configured to:
  - detect a folding of the foldable housing caused by a user gesture,
  - identify status information of the electronic device in response to detecting the folding of the foldable housing,
  - determine a user's intention for the user gesture, based on both the user gesture and the status information of the electronic device,
  - select an external electronic device to be connected to the electronic device, based on the user's intention, a characteristic of content being played on the electronic device, and characteristics of the external electronic device,
  - control the communication module to be connected to the selected external electronic device, and
  - control the display to display a screen associated with control of the external electronic device.

11. An operating method of an electronic device, the method comprising:
- detecting a folding of a foldable housing caused by a user gesture while a content is played on a flexible display of the electronic device, the foldable housing including a first housing structure and a second housing structure foldably connected to the first housing structure;
- identifying status information of the electronic device, the status information of the electronic device including information regarding a characteristic of the content;
- in response to detecting the folding of the foldable housing, identifying at least one external electronic device to display the content based on the status information;
- displaying a selection screen on a display of the electronic device for receiving a user input for selecting one of the identified external electronic device, the selection screen including a list of the identified external electronic device to output the content; and
- transmitting a control signal for displaying the content on the selected external electronic device to the selected external electronic device.

12. The method of claim 11, wherein the method further comprises:
- selecting an external electronic device from among the identified external electronic device connected to the electronic device based on the characteristics of the content being played back and characteristics the identified external electronic device.

13. The method of claim 11, wherein the method further comprises:
- identifying an aspect ratio of a content output screen changed by the user gesture; and
- selecting an external electronic device for displaying content from among the identified external electronic device based on the aspect ratio.

14. The method of claim 11, wherein the method further comprises:
- displaying, on the display disposed on a first surface of the foldable housing opposite to a second surface of the foldable housing on which the flexible display is disposed, a screen for receiving a user input for controlling an external electronic device or a list of at least one external electronic device to play back content.

15. The method of claim 11, wherein the status information of the electronic device includes location information of the electronic device detected by a location measuring sensor included in the electronic device, and
- wherein the method further comprises:
  - determining a particular operation to perform based on the location information.

16. The method of claim 15, wherein the method further comprises:
- executing an application associated with a location of the electronic device, based on the location information; and
- displaying a screen associated with the executed application on the display disposed on a first surface of the foldable housing opposite to a second surface of the foldable housing on which a flexible display structure is disposed.

* * * * *